(12) United States Patent
Kato et al.

(10) Patent No.: US 7,532,303 B2
(45) Date of Patent: May 12, 2009

(54) AUTOMATIC FOCUSING APPARATUS

(75) Inventors: Yuichi Kato, Higashiyamato (JP);
Takahiro Kawada, Iruma (JP)

(73) Assignee: Citizen Holdings Co., Ltd., Tokyo (JP)

( * ) Notice: Subject to any disclaimer, the term of this patent is extended or adjusted under 35 U.S.C. 154(b) by 209 days.

(21) Appl. No.: 11/798,531

(22) Filed: May 15, 2007

(65) Prior Publication Data
US 2007/0268417 A1 Nov. 22, 2007

(30) Foreign Application Priority Data
May 16, 2006 (JP) ............... 2006-136571

(51) Int. Cl.
*G02F 1/13* (2006.01)
(52) U.S. Cl. ........................ 349/200; 349/33
(58) Field of Classification Search .................. 349/33, 349/200
See application file for complete search history.

(56) References Cited

FOREIGN PATENT DOCUMENTS

| JP | 1-15188 B2 | 3/1989 |
|---|---|---|
| JP | 2-11068 B2 | 3/1990 |
| JP | 2742741 B2 | 4/1998 |
| JP | 3047082 B2 | 5/2000 |
| WO | WO 2006/054562 A1 | 5/2006 |

*Primary Examiner*—David Nelms
*Assistant Examiner*—David Y Chung
(74) *Attorney, Agent, or Firm*—Westerman, Hattori, Daniels & Adrian, LLP.

(57) ABSTRACT

Predetermined voltage is applied to a liquid crystal lens by a liquid crystal lens driver. Image signals are generated based on an optical image passed through the liquid crystal lens during transient response operation caused by application of the predetermined voltage, and plural focus signals are extracted by sampling the image signals of the area from which the focus signals are extracted at predetermined cycles. Levels of the extracted focus signals are compared to determine the maximum value of the focus signal. Thus, with the liquid crystal lens, by making use of the transient response operation of the liquid crystal lens, a focus point can be detected in sufficient speed.

12 Claims, 34 Drawing Sheets

FIG. 7

| | TYPE | CORE ELECTRODE: Vinner [V] | PERIPHERAL ELECTRODE: Vouter [V] | FOCAL LENGTH: f [mm] |
|---|---|---|---|---|
| CONVEX LENS | 1 | 1 | 5 | 100 |
| | 2 | 1 | 4 | 200 |
| | 3 | 1 | 3 | 500 |
| | 4 | 1 | 2 | 1000 |
| | 5 | 1 | 1 | ∞ |
| CONCAVE LENS | 6 | 2 | 1 | −1000 |
| | 7 | 3 | 1 | −500 |
| | 8 | 4 | 1 | −200 |
| | 9 | 5 | 1 | −100 |

AUTOMATIC FOCUSING APPARATUS

BACKGROUND OF THE INVENTION

1. Field of the Invention

The present invention relates to an automatic focusing apparatus (device), and particularly to an automatic focusing apparatus that detects a focus point using a liquid crystal lens for adjustment of focal length, by extracting plural focus signals corresponding to a focus matching degree from image signals obtained from optical images that are formed through the liquid crystal lens during transient response operation of the liquid crystal lens, and by detecting a maximal value of the focus signal.

2. Description of the Related Art

Conventionally, as a focus mechanism changing the focal length or focus position of an optical system, the system of adjusting the focus by moving a lens has been widely used. However, this system needs a lens drive mechanism and thus has defects that the mechanism becomes complicated and needs comparatively high electric power for the lens-drive motor. Moreover, shock resistance is generally low. Therefore, as a focusing apparatus that does not require the lens drive mechanism, such a system that adjusts the focus by changing the refractive index of a liquid crystal lens has been proposed (for example, see Patent document 1).

The liquid crystal lens used for the focusing apparatus of this method has a configuration of holding a liquid crystal layer between two glass substrates each of which is equipped with a pattern electrode and a common electrode. This pattern electrode has a core electrode and plural ring electrodes, and has a configuration that the core electrode and each of the ring electrodes are connected by a voltage drop resistor. To an extraction electrode that is connected to the core electrode but is insulated from each ring electrode, a variable resistor is connected via a power amplifier, and to an extraction electrode that is connected to a ring electrode (a peripheral electrode), variable resistor is connected via an amplifier. Furthermore, the alternating voltage supplied from the alternating power source connected in parallel with these variable resistors is lowered by the variable resistors.

Thus, the voltage distribution is formed by the voltage signal applied to the extraction electrodes and the voltage drop resistors, and the voltage by the voltage distribution is applied on the liquid crystal layer. And it becomes possible to generate various forms of voltage distribution applied on the liquid crystal layer by adjusting each variable resistor.

As an autofocus (automatic focusing) system for a video camera, a contour detection system is publicly known that extracts information corresponding to blurriness of an image directly from a photograph image signal and carries out hill-climbing control of the lens to minimize the blurriness. Various autofocus devices and the like using this hill-climbing control system have been proposed (for example, see Patent Document 2, 3, 4).

Patent Document 1: JP No. 3047082B
Patent Document 2: JP No. 2742741B
Patent Document 3: JP No. H01-15188B
Patent Document 4: JP No. H02-11068B However, adjustment of the focus by controlling changes in the refractive index of the liquid crystal lens by the hill-climbing control has not been reported, so far. It is considered that is because the liquid crystal lens takes a long time to detect the focus point by the hill-climbing control. For example, assuming that 50 focus positions are set in advance in from a short- to long-distance view, and assuming that it is necessary to check 25 positions on average until a minimum point is found when the minimum point information corresponding to blurriness is searched in a certain direction, time required to detect the focus point is compared between the method of moving a lens is applied and the method of using a liquid crystal lens is applied.

In the method of moving the lens, such an operation is repeated that the lens is moved to a position corresponding to a certain position and the information corresponding to the blurriness is obtained at this time, then the lens is moved to another position corresponding to a next position and obtains the information corresponding to blurriness. In this case, since the processing time at one position is as short as 67 milliseconds, for example, the time required for detecting the focus point is approximately 1.7 seconds (=67 ms×25 position) on an average.

On the other hand, in the method using the liquid crystal lens, to drive the liquid crystal lens, distribution of the refractive index of the liquid crystal is altered by changing the voltage (driving voltage) applied. Accordingly, such an operation is repeated should be repeated that a driving voltage corresponding to a certain position is applied to the liquid crystal lens to obtain information corresponding to the blurriness at that time, and then a driving voltage corresponding to a next position is applied to the liquid crystal lens to obtain the information corresponding to the blurriness.

However, since the response of the liquid crystal to the driving voltage change is generally delayed, it is necessary to wait after change of the driving voltage until the response of the liquid crystal is stabilized. Therefore, the processing time per one position becomes long, for example 500 milliseconds, and the time to detect a focus point takes approximately 12.5 seconds (500 ms×25 positions) on average, and it is impractical.

Moreover, according to Patent Document 1, the liquid crystal lens has a configuration in which voltages are applied to both ends of the voltage drop resistors, and naturally, there is a case when the voltage applied to one end is lower than that to the other end. For example, when the liquid crystal is expected to act as a convex lens, low voltage is applied to one extraction electrode, and high voltage is applied to another extraction electrode.

In this case, depending on a used liquid crystal material of the liquid crystal layer, the completion time of the transient response of the liquid crystal on the side of lower applied voltage becomes later than the completion time of the transient response of the liquid crystal on the side of higher applied voltage. Thus, for a liquid crystal lens to act as a convex lens, the response time of the liquid crystal on the side with the low applied voltage determines the required time for the crystal to function as a convex lens.

Especially, when trying to pull out the power of the lens to the maximum extent, voltage difference between the core electrode and the peripheral electrode is made the maximum, thus on the side of the liquid crystal layer to which a lower voltage is applied, the lowest possible voltage at which liquid crystal molecules effectively operate is to be used, so that there has been a problem that a long time period is required until the lens becomes to have a suitable refractive index distribution on this side (until the transient response is completed).

Furthermore, when the power of a lens is enlarged as much as possible, the birefringence index of the liquid crystal material or thickness of the liquid crystal layer must be enlarged. However, when such a configuration is adopted, there has been a problem that the response of the liquid crystal becomes slow and a long time period is required until the lens becomes to have a suitable refractive index distribution.

SUMMARY OF THE INVENTION

To solve the problems in the conventional technology mentioned above, it is an object of the present invention to provide an automatic focusing apparatus that can detect the focus point with a sufficient speed and precision for practical use, by detecting a peak value of focus signals after collectively extracting plural focus signals corresponding to a focus matching degree during a transient response operation of a liquid crystal lens.

In order to achieve an above object, the automatic focusing apparatus according to the present invention includes an optical lens unit including a liquid crystal lens; a photoelectric converting unit that converts an optical image formed through the optical lens unit into an electrical signal to output an image signal; and a liquid crystal lens control unit that extracts a focus signal corresponding to a focus matching degree from the image signal, and controls a driving condition of the liquid crystal lens such that the focus signal becomes maximum value.

The liquid crystal lens control unit includes an area setting unit that set an area from which the focus signal is extracted of the optical image formed through the optical lens unit, a voltage applying unit that applies a predetermined voltage to the liquid crystal lens, a focus signal extracting unit that extracts a plurality of focus signals by performing, at predetermined cycles, sampling of an image signal generated based on an optical image of the area set by the area setting unit by the light that has passed through the liquid crystal lens under transient response operation caused by application of the predetermined voltage by the voltage applying unit, and a focus point judging unit that judges a maximum value of the focus signal based on the focus signals extracted by the focus signal extracting unit.

The area setting unit can set a predetermined area at the center portion of an entire image formation area as the area which the focus signal is extracted.

Alternatively, the area setting unit can divide the entire image formation area into a matrix form, and select and sets one or more of the divided individual areas as the area from which the focus signal is extracted.

In this instance, preferably, the apparatus has a threshold value setting unit that sets a threshold value of the maximum value of the focus signal judged by the focus point judging unit, and when the maximum value of the focus signal judged by the focus point judging unit dose not exceed the threshold value, the area setting unit changes the selection of the divided individual areas and reset the area from which the focus signal is extracted.

Otherwise, the area setting unit can set the predetermined area at the central portion of the entire image formation area and a plurality of areas at the peripheral portion in combination as the area from which the focus signal is extracted.

In these automatic focusing apparatus, the voltage applying unit can apply, as the predetermined voltage, a voltage to bring the liquid crystal lens into a convex lens state.

Alternatively, the voltage applying unit may also apply, as the predetermined voltage, a voltage to bring the liquid crystal lens into a concave lens state.

Further, the voltage applying unit can also apply, as the predetermined voltage, a first voltage to bring the liquid crystal lens into a convex lens state, and a second voltage to bring the liquid crystal lens into a concave lens state, at different timings.

In this instance, the voltage applying unit may apply voltage such that a period is present in which a third voltage that is neither to bring the liquid crystal lens into the convex lens state nor to bring the liquid crystal lens into the concave lens state is applied, between a period in which the first voltage is applied to the liquid crystal lens and a period in which the second voltage is applied to the liquid crystal lens.

Also, when the focus point judging unit judges that the focus signal is at a maximum value while the liquid crystal lens is in the transient response operation caused by application of either of the first voltage and the second voltage by the voltage applying unit, the liquid crystal lens control unit may cancel application of the other one of the first voltage or the second voltage to the liquid crystal lens by the voltage applying unit.

Also preferably, the liquid crystal lens includes a liquid crystal layer held between two transparent substrates each of which has a pattern electrode and a common electrode formed thereon, the pattern electrode including a core electrode and peripheral electrodes connected with resistors, and the voltage applying unit applies different predetermined voltages to the core electrode and to the peripheral electrodes.

Further, the liquid crystal lens control unit may include a measuring unit that measures elapsed time since the sampling is started; a first storage unit that stores in advance data in which the elapsed time at each time point of sampling the image signal and a focal length of the liquid crystal lens are associated; a second storage unit that stores in advance data in which a driving voltage of the liquid crystal lens in a static state and the focal length are associated, and the driving voltage of liquid crystal lens is obtaind based on the data in the first storage unit and the second storage unit, from the elapsed time by the measuring unit at the time point corresponding to the focus signal judged as the maximum value by the focus point judging unit, and the obtained driving voltage can be applied to the liquid crystal unit, and the obtained driving voltage can be applied to the liquid crystal lens.

The automatic focusing apparatus according to the present invention, it is capable of detecting a focus point sufficiently speedily in practical use by using a liquid crystal lens for adjustment of focal length from the predetermined area set as area which extracts the focus signal of an entire image formation area, by collectively extracting a plurality of focus signals corresponding to focus matching degree during a transient response operation of the liquid crystal lens, and by detecting a maximum value (a peak value) of the focus signals.

The above and other objects, features and advantages of the invention will be apparent from the following detailed description which is to be read in conjunction with the accompanying drawings.

BRIEF DESCRIPTION OF THE DRAWINGS

FIG. 7 is a table showing an example of a relation between the focal length of the liquid crystal lens and a driving voltage in a static condition;

FIG. 36 is an explanatory diagram showing the example of the area which can be selected set up by S202 of FIG. 33: and.

DETAILED DESCRIPTION OF THE PREFERRED EMBODIMENTS

Exemplary embodiments of an automatic focusing apparatus according to the present invention are explained below in detail with reference to accompanying drawings.

Figure 1:
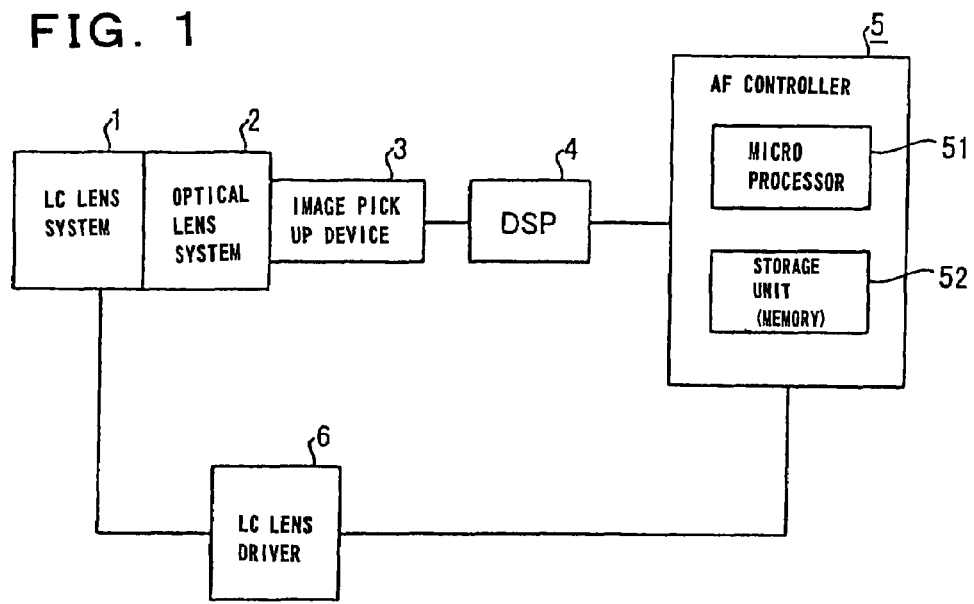
FIG. 1 is a block diagram of a schematic configuration of one embodiment of an automatic focusing apparatus according to the present invention.

FIG. 1 is a block diagram of one embodiment of a schematic configuration of the automatic focusing apparatus according to the present invention. The automatic focusing apparatus includes a liquid crystal (LC) lens system 1, an optical lens system 2, an image pickup device 3, a DSP (a digital signal processor) 4, an automatic focusing (AF) controller 5, and a liquid crystal (LC) lens driver 6. The liquid crystal lens system 1 has a structure in which a liquid crystal lens for a P wave and a liquid crystal lens for an S wave are combined. The optical lens system 2 has an aperture, a pan-focus group lens and an infrared cut-off filter. The image pickup device 3 has an image sensor including a solid state image pickup device, such as a CCD and a CMOS, and an analog-digital (A/D) converter.

The optical images focused by passing through the liquid crystal lens system 1 and the optical lens system 2 are converted into electrical signals by the image sensor of the image pickup device 3. The electrical signals output from the image sensor are converted into digital signals by the A/D converter. The DSP 4 performs an image processing on the digital signals output from the A/D converter. The AF controller 5 extracts multiple focus signals corresponding to the focus matching degree (hereafter referred to as autofocus signals) by sampling, with a predetermined cycle, the image signals output from the DSP 4 during transient response operation periods of the liquid crystal lens. And the AF controller 5 judges the sampling timing when the autofocus signal level becomes the maximum based on the extracted plural autofocus signals, and controls the driving condition of the liquid crystal lens system 1 based on the result of the judgment.

The AF controller 5 has a microprocessor 51 that performs a series of controls mentioned above and a storage unit (memory) 52. The storage unit 52 has a read-only memory unit (ROM unit) which stores the programs the microprocessor 51 performs and various relations required to obtain the optimal driving voltage and the like, and a writable memory unit (RAM unit) used as a working area of the microprocessor 51. The liquid crystal lens driver 6 applies a voltage to the liquid crystal lens system 1, based on the control signal output from the AF controller 5.

Processing performed by the AF controller 5 will be described later. The liquid crystal lens system 1 and the optical lens system 2 correspond to the optical lens unit. The image pickup device 3 and the DSP 4 correspond to the photoelectric converting unit. The AF controller 5 corresponds to an area setting unit that sets an area from which the focus signal is extracted of the optical image formed through the optical lens unit, the focus signal extracting unit and the focus point judging unit of the liquid crystal lens control unit. The liquid crystal lens driver 6 corresponds to the voltage applying unit of the liquid crystal lens control unit.

Figure 2:
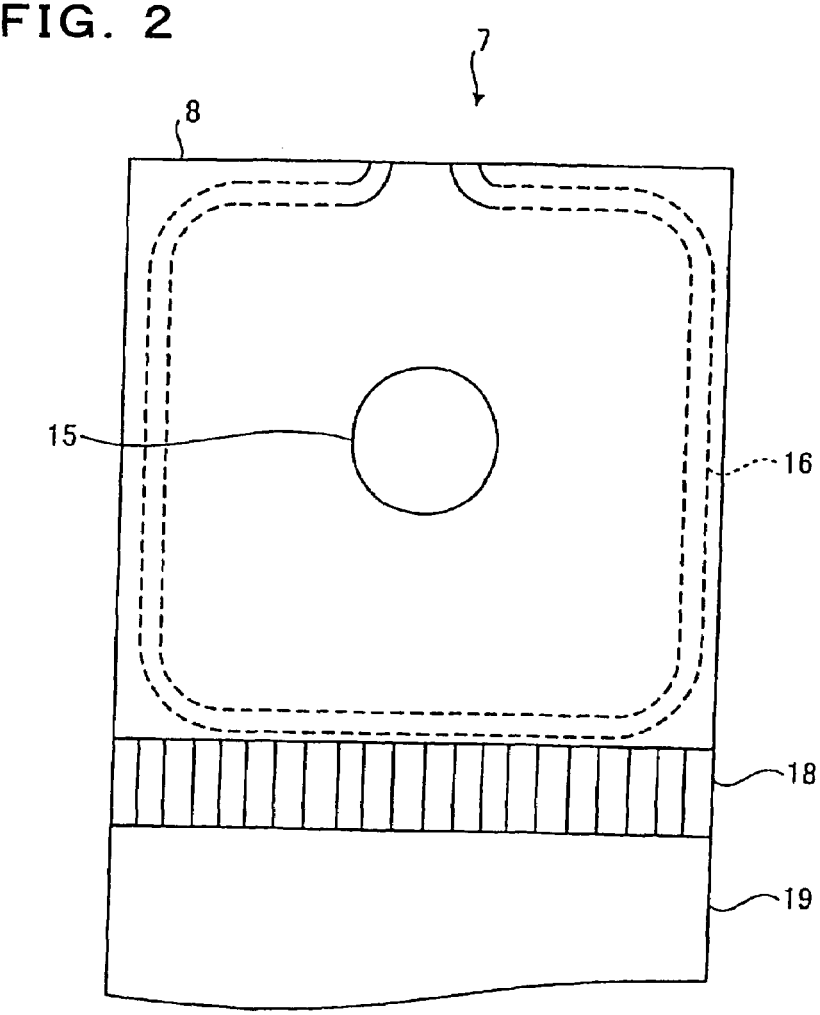
FIG. 2 is a front view of a configuration example of a liquid crystal lens installed in the LC lens system of FIG. 1.
Figure 3:
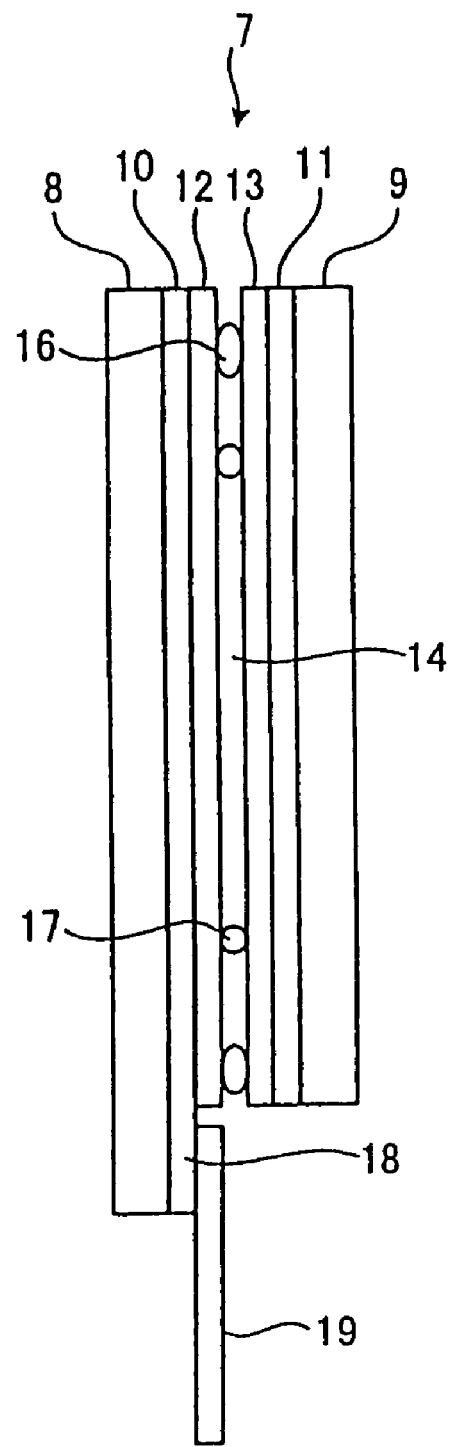
FIG. 3 is a sectional view of the liquid crystal lens.

FIGS. 2 and 3 are, respectively, a front view and a cross-section showing a cell configuration of the liquid crystal lens. As shown in these figures, in a liquid crystal lens 7, a pattern electrode 10 and a common electrode 11 are arranged facing with each other inside a pair of confronting glass substrates 8 and 9, and inside the pattern electrode 10 and the common electrode 11, oriented films 12 and 13 are arranged face to face, constituting a liquid crystal panel with an enclosed liquid crystal layer 14 with homogeneous alignment, for example, between them.

Although the configuration of the liquid crystal lens for the P wave and that for the S wave are the same, the alignment directions of the liquid crystal layers 14 differ by 90° with each other. This is because, when the refractive index distribution of the liquid crystal lens for the P wave is changed, the light having the polarization plane in the same direction as the alignment direction of the liquid crystal lens for the P wave is affected by the change in the refractive index distribution, but the light that has the polarization plane in the direction perpendicular to the alignment direction of the liquid crystal lens for the P wave is not affected by the change in the refractive index distribution. The same may hold for the liquid crystal lens for S waves.

Therefore, two liquid crystal lenses of which alignment directions differ by 90°, i.e., the liquid crystal lenses for the P wave and for the S wave, are necessary. The liquid crystal lens for the P wave and that for the S wave are driven by the driving voltages with the same waveform. The driving voltage is, for example, a pulse height modulated (PHM) or a pulse width modulated (PWM) alternating voltage.

In the center portion of the liquid crystal panel, a lens portion 15 of which refractive index changes according to the applied voltage is formed. And the edge part of the liquid crystal panel is sealed by a sealing member 16 and sealing material (not shown in the figure). The thickness of the liquid crystal layer 14 is kept constant by spacer members 17. To an electrode takeout portion 18 of the pattern electrode 10, a flexible printed circuit board (FPC) 19 is connected using an anisotropic electroconductive film. A part of the electrode takeout portion 18 is insulated from the pattern electrode 10, and is connected to the common electrode 11.

Dimension of the liquid crystal lens 7 is shown as an example without limiting in particular. The length of one side of the glass substrates 8, 9 is from several mm to ten and several mm, for example, 10 mm. However, for the glass substrate 8 on the side of the pattern electrode 10, it is a dimension except the part which covers the electrode takeout portion 18 of the pattern electrode 10. The thicknesses of the glass substrates 8, 9 are about several hundreds of µm, for example, 300 µm. The thickness of the liquid crystal layer 14 is from about ten and several µm to about several tens of µm, for example, 23 µm. The diameter of the lens unit 15 is about several mm, for example, 2.4 mm.

Figure 4:
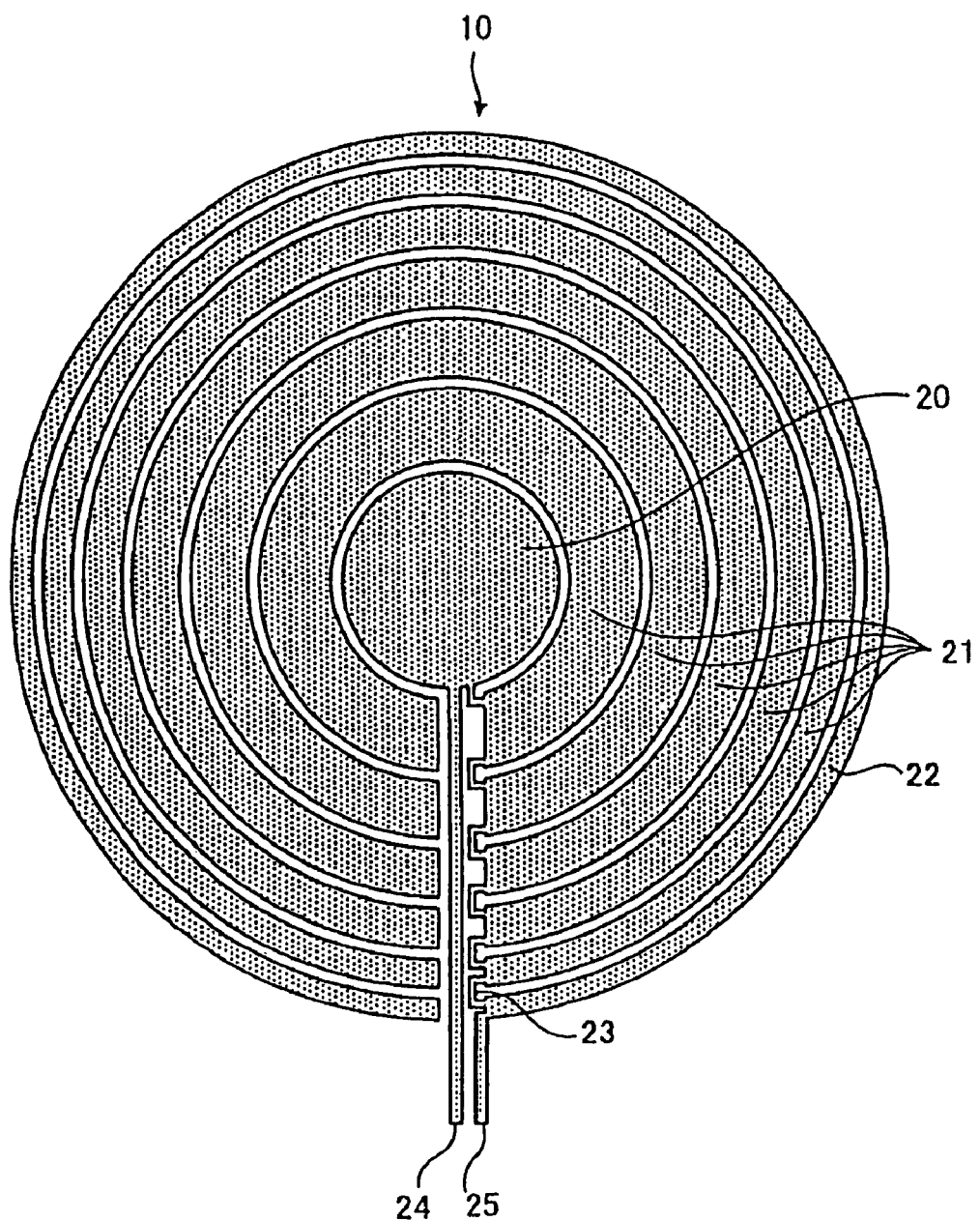
FIG. 4 is a front view of a configuration example of a pattern electrode of the liquid crystal lens.

FIG. 4 is a front view of a configuration of configuration of the pattern electrode 10. As shown in FIG. 4, the pattern electrode 10 has a pattern in which plural C-shaped ring electrodes 21 and 22 are arranged concentrically with different radii around the round-shaped core electrode 20. There are spaces between the core electrode 20 and the innermost ring electrode 21 and between the adjacent ring electrodes 21 and 22. In addition, the core electrode 20 and the innermost ring electrode 21, and the adjacent ring electrodes 21 and 22, are connected, respectively, by ring connections 23.

From the core electrode 20, a core extraction electrode 24 extends to the outside of the ring electrode 22 on the outermost periphery (hereafter, "peripheral electrode 22"), separated (i.e., insulated) from other ring electrodes 21 and 22 and the ring connections 23. On the other hand, from the peripheral electrode 22, peripheral extraction electrode 25 is extended to the outside thereof, insulated from other electrodes. The pattern of the pattern electrode 10 shown in FIG. 4 is arranged so as to be superimposed on the lens unit 15 shown in FIG. 2.

Depending on the voltages applied to the core extraction electrode 24 and to the peripheral extraction electrode 25, respectively, a situation arises wherein the voltage values of the core electrode 20, of each ring electrode 21 existing between the core electrode 20 and the peripheral electrode 22, and of the peripheral electrode 22, against the common electrode 11, respectively, are different. That is, voltage distribution is generated in the lens portion 15 by the pattern electrodes 10. By changing this voltage distribution, distribution of the refractive index of the liquid crystal lens 7 is changed, and the liquid crystal lens 7 can be put into the convex lens state, into the parallel glass state, or into the concave lens state.

The dimension and characteristics of each part of the pattern electrodes 10 are shown as an example, without particular limitation. The total number of the core electrode 20, the peripheral electrode 22, and the ring electrodes 21 between them is, for example, 27. Moreover, the diameter of the core electrode 20, the width of each ring electrode 21 and the width of the peripheral electrode 22 are chosen so that a desired distribution of the refractive index can be obtained in the lens portion 15. The width of the space between the adjacent two among the core electrode 20, the ring electrodes 21, and the peripheral electrode 22 is 3 µm, for example. The resistance of each ring connection 23 is, for example, 1 kΩ. In addition, the form of pattern electrodes 10 of liquid crystal lens 7 is not restricted to the avobe mentioned composition, the liquid crystal lens 7 can be put into the state of the convex lens, the state of parallel glass or the state of the concave lens as well as the above-described, by driving control for each ring electrode 21 independently respectively.

Figure 5:
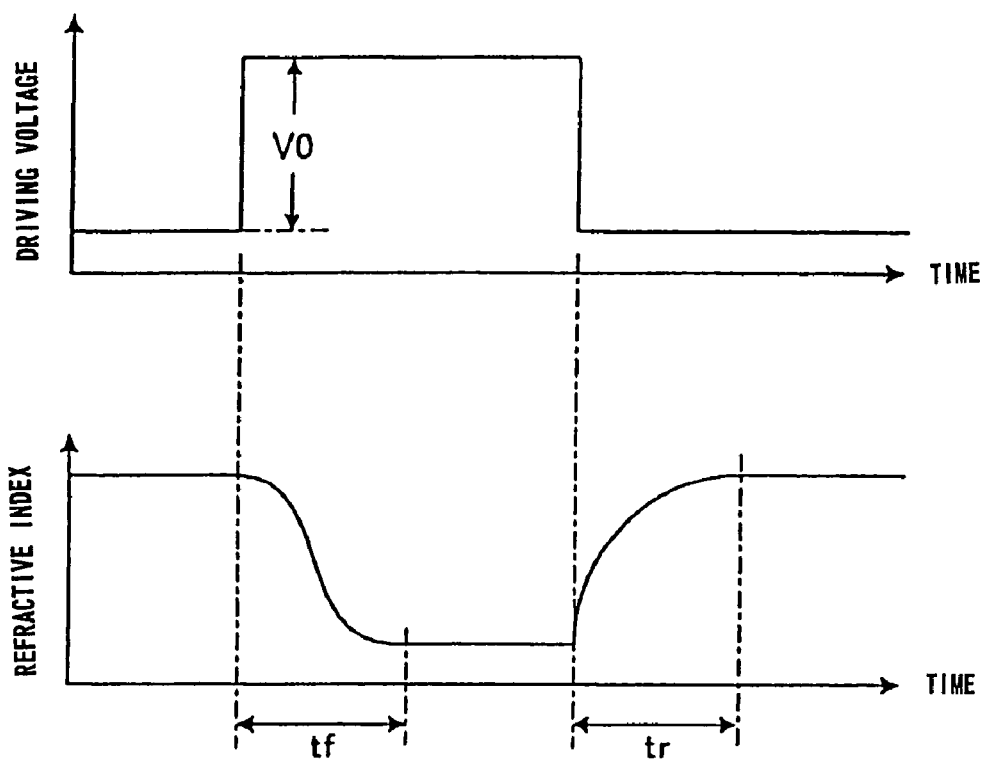
FIG. 5 is a diagram showing change example of a refractive index when voltage is applied to liquid crystal of the liquid crystal lens.

Next, an explanation will be given about the change in the refractive index when voltage is applied to the liquid crystal under the condition that light having the polarization plane in the same direction as the alignment direction of the liquid crystal is passing through the liquid crystal. If the driving voltage V0 is applied to the liquid crystal from the exterior as shown in FIG. 5, the refractive index of the liquid crystal becomes in the condition corresponding to the driving voltage V0 being delayed by the time tf from the timing of rise of the driving voltage V0. Moreover, the refractive index of the liquid crystal returns to the original state being delayed by the time tr from the timing of fall of the driving voltage V0. These times tf and tr are periods during which the liquid crystal is carrying out the transient response operation, and thus the refractive index changes gradually. Here, the driving voltage V0 is, for example, a pulse height modulated (PHM) or a pulse width modulated (PWM) alternating voltage, as mentioned above.

Assuming to use, for example, the liquid crystal lens 7 and the pattern electrodes 10 in which the dimensions and characteristics of each portion have the values mentioned above. Moreover, assuming to use, for the liquid crystal layer 14, a nematic liquid crystal of which the refractive index ne for the extraordinary light and the refractive index no for the ordinary light are 1.75 and 1.5 respectively, and of which the birefringence Δn is 0.25. In this case, both the transient response operation time tf of the liquid crystal for the rise of the driving voltage V0 from 0 V to 5 V and the transient response operation time tr of the liquid crystal for the fall of the driving voltage V0 from 5 V to 0 V are about 500 ms.

Figure 6:
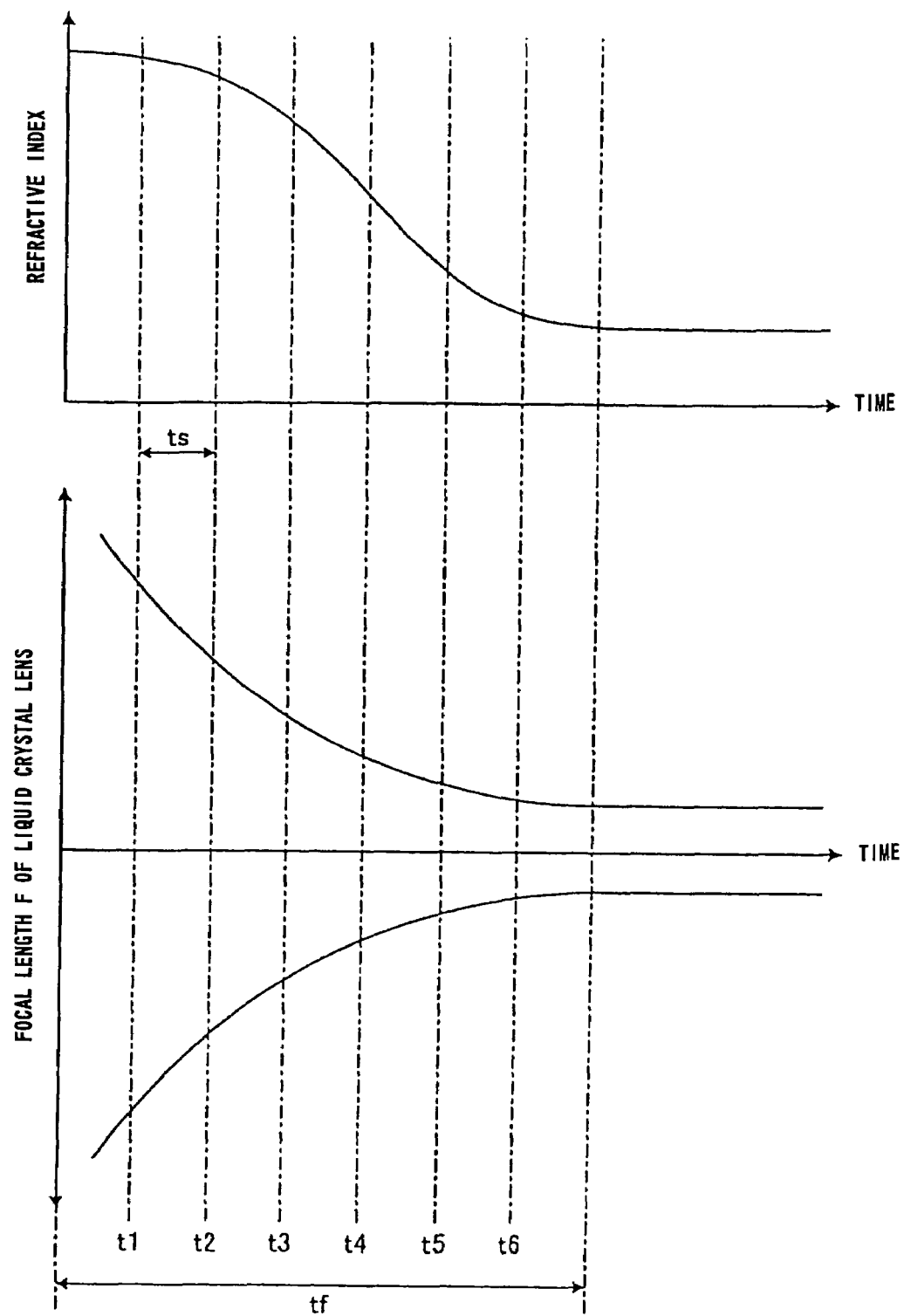
FIG. 6 is a diagram showing a relation with the change of the refractive index of liquid crystal and change of focal length of the liquid crystal lens during a transient response operation period of the liquid crystal lens.

In this way, it takes a certain period of time for the liquid crystal to complete the transient response operation. Thus, in the first embodiment, the image signals generated from the optical images which have passed through the liquid crystal lens system 1 and the optical lens system 2 are sampled with a predetermined cycle during the transient response operation period of the liquid crystal. In FIG. 6, the processes of the changes in the refractive index of the liquid crystal and in the focal length of the liquid crystal lens 7 during the transient response operation period tf upon the rise of the driving voltage are shown.

For example, as shown in FIG. 6, the refractive index of the liquid crystal changes during the transient response operation period tf and becomes constant after the transient response operation period tf has passed, so that the refractive index of the part of the liquid crystal corresponding to the core electrode 20, to each of the ring electrodes 21, and to the peripheral electrode 22 of the liquid crystal lens 7, respectively, becomes constant. Therefore, at the time when the transient response operation period tf has passed, the distribution of the refractive index of the liquid crystal lens 7 becomes settled as a certain distribution, and the focal length f of the liquid crystal lens 7 converges to a definite value according to the refractive index distribution.

The each curve drawn upper side and lower side than a horizontal axis as a curve of the focal length f of the lens in FIG. 6, represent the profiles of changes in the focal length f in the cases when the liquid crystal lens 7 is in the convex lens state, and in the concave lens state. In the first embodiment, for the convenience of description, when the liquid crystal lens 7 is in the convex lens state, the focal length f is expressed with a positive value, and when the liquid crystal lens 7 is in the concave lens state, the focal length is expressed with a negative value. When expressed in this way, the liquid crystal lens 7 is in the parallel glass state when f is positive or a negative infinity.

In the example shown in FIG. 6, image signals are sampled at the times t1, t2, t3, t4, t5, and t6 during the transient response operation period tf which is the time for the focal length of the liquid crystal lens 7 to converge to a constant value. At each sampling time, the focal length f of the liquid crystal lens 7 differs. Therefore, image signals generated from the optical images passed through the liquid crystal lens 7 with various focal lengths f can be sampled during one transient response operation period, and thus multiple focus signals corresponding to the focus matching degree can be extracted.

Here, the sampling period ts synchronizes, for example, with the period of the frames. In addition, the image signals may be sampled during the transient response operation period tr of the liquid crystal lens 7 upon the fall. Moreover, the sampling number may not be limited to six.

The relations between the elapsed time from a sampling start point and the focal lengths of the liquid crystal lens 7, such as the focal length f1 of the liquid crystal lens 7 at the first sampling time t1 and the focal length f2 of the liquid crystal lens 7 at the second sampling time t2 are determined beforehand. These relations are stored, for example, in the ROM unit of the storage unit 52 (it functions as the first storage unit) in the AF controller 5 shown in FIG. 1.

Thus, the microprocessor 51 of the AF controller 5 which is also has the function of a measurement unit to measure the lapsed time after a sampling is started, can find the focal length of the liquid crystal lens 7 at each sampling time based on the image signal sampling time during the transient response operation period of the liquid crystal lens 7. By those procedures, the correspondence between each focal length of the liquid crystal lens 7 and the level of the focus signal can be determined, and therefore the focal length of the liquid crystal lens 7 when the level of the focus signal is the maximum, i.e., when the image is in focus, can be found.

Moreover, the relation between the focal length f of the liquid crystal lens 7 in a static state and the driving voltage applied to the liquid crystal lens 7 to make the focal length f of the liquid crystal lens 7 a certain value, such as the value of the voltage Vouter of the peripheral electrode 22 and the voltage Vinner of the core electrode 20 when the focal length of the liquid crystal lens 7 is f1 in a static state, and the values of Vouter and Vinner when the focal length of the liquid crystal lens 7 is f2 in a static state has been obtained. This relation is also stored, for example, in the ROM unit of the storage unit 52 (it functions as the second storage unit) in the AF controller 5.

Therefore, the microprocessor 51 which is also a liquid crystal lens control unit, to actually bring the object into focus, namely to adjust the focal length of the liquid crystal lens 7 to the focal length when the level of the autofocus signal becomes the maximum, the driving voltage of the liquid crystal lens can be obtained based on the data in the first storage unit and the second storage unit, from the elapsed time by the measuring unit at the time point corresponding to the focas signal judged as the maximum value the focus point judging unit which is a self function, and the obtained driving voltage may be applied to the liquid crystal lens 7. In FIG. 7 an example of the relation between the focal lengths of the liquid crystal lens 7 in the static state, and the voltage applied to the liquid crystal lens 7 to make the focal length of the liquid crystal lens 7 a given value is shown.

Next, the voltage application pattern to the liquid crystal lens 7 for changing the liquid crystal lens 7 into both the convex lens state and the concave lens state is explained. The liquid crystal lens 7 becomes in the convex lens state when the voltage Vouter applied to the peripheral electrode 22 in the pattern electrode 10 is higher than the voltage Vinner applied to the core electrode 20, and when the situation is reversed, it becomes in the concave lens state. The following 12 kinds can be considered as the voltage application patterns.

Figure 8A:
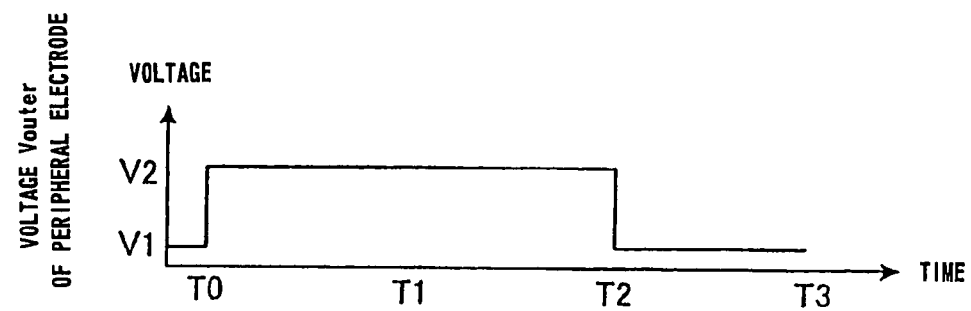
FIGS. 8A, 8B and 8C are diagrams showing in a first voltage application pattern to the peripheral electrode and the core electrode of the liquid crystal lens, and change in inverse of the focal length respectively.
Figure 8B:

In the first pattern, as shown in FIGS. 8A and 8B, first both the voltage Vouter applied to the peripheral electrode 22 of the pattern electrode 10 and the voltage Vinner applied to the core electrode 20 are set to be the first voltage V1. Subsequently, at time T0, only the voltage Vouter of the peripheral electrode 22 is changed to the second voltage V2 higher than the first voltage V1. Next, at time T1, only the voltage Vinner of the core electrode 20 is changed to the second voltage V2. Then, at time T2, only the voltage Vouter of the peripheral electrode 22 is changed to the first voltage V1, and the operation is terminated at time T3.

Figure 8C:
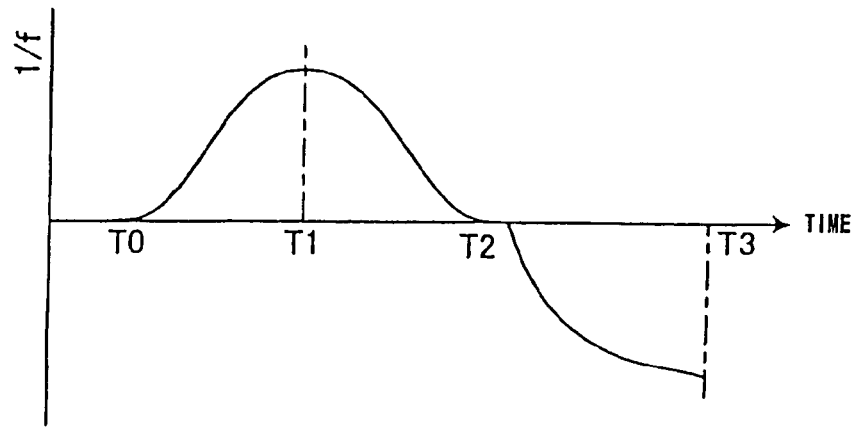

The liquid crystal lens 7 is in the parallel glass state at time T0. In the period from time T0 to time T1, it is in the convex lens state in which the lens power becomes larger gradually. In the period from time T1 to time T2, it is in the convex lens state in which the lens power gradually becomes smaller, and in the period from time T2 to time T3, it is in the concave lens state in which the lens power becomes larger gradually. FIG. 8C is a chart showing the change of the inverse of the focal length f in the first pattern.

As shown in FIG. 8C, the value of 1/f is zero at time T0. Between time T0 and time T1, the value changes along a downward convex curve, and then along an upward convex curve after passing an inflection point. At time T1, it becomes the maximum positive value. Therefore, at the time T1, the liquid crystal lens becomes in the convex lens state with the maximum lens power. Between time T1 and time T2, the value of 1/f changes along an upward convex curve, passes the inflection point and changes along a downward convex curve to reach the value zero. Between time T2 and time T3, the value changes along a downward convex curve to become the maximum negative value at time T3.

Therefore, at the T3, the lens is in the concave lens state with the largest lens power. If the first voltage V1 is set to 0 V and the second voltage V2 is set to 5 V, the voltage Vouter of the peripheral electrode 22 rises at time T0, and the transient response operation period tf of the liquid crystal lens 7 is about 500 ms this time, as mentioned above.

At time T1, the voltage Vinner of the core electrode 20 rises, and the transient response operation period tf of the liquid crystal lens 7 this time is about 500 ms, as mentioned above. Furthermore, at time T2, the voltage Vouter of the peripheral electrode 22 falls and the transient response operation time tr of the liquid crystal lens 7 this time is about 500 ms, as mentioned above. Therefore, the time required to complete the autofocus control is about 1.5 seconds in total.

Figure 9A:
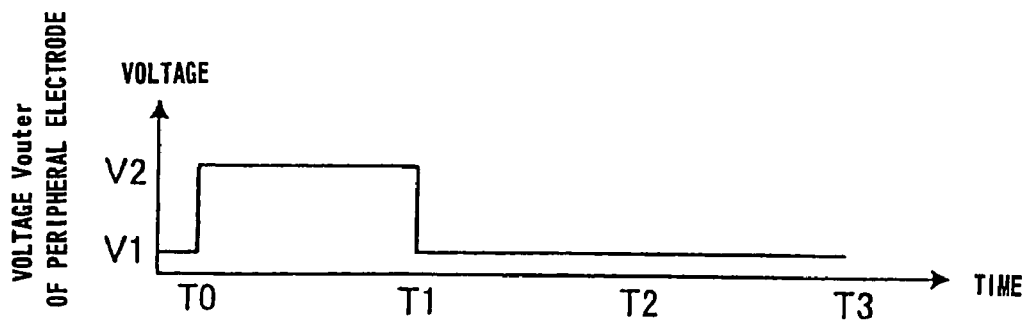
FIGS. 9A, 9B and 9C are diagrams showing a second voltage application pattern to the peripheral electrode and the core electrode of the liquid crystal lens, and change in inverse of the focal length respectively.
Figure 9B:
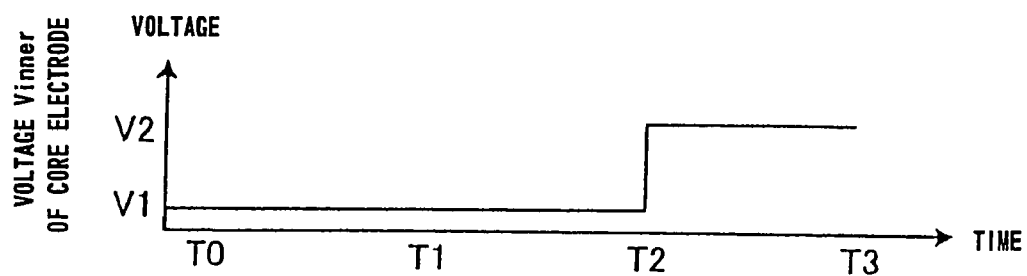

In the second pattern, as shown in FIGS. 9A and 9B, both the voltage Vouter of the peripheral electrode 22 and the voltage Vinner of the core electrode 20 are first set to be the first voltage V1. Subsequently, at time T0, only the voltage Vouter of the peripheral electrode 22 is changed to the second voltage V2. Next, at time T1, only the voltage Vouter of the peripheral electrode 22 is changed to the first voltage V1. Then, at time T2, only the voltage Vinner of the core electrode 20 is changed to the second voltage V2, and the operation is terminated at time T3.

Figure 9C:
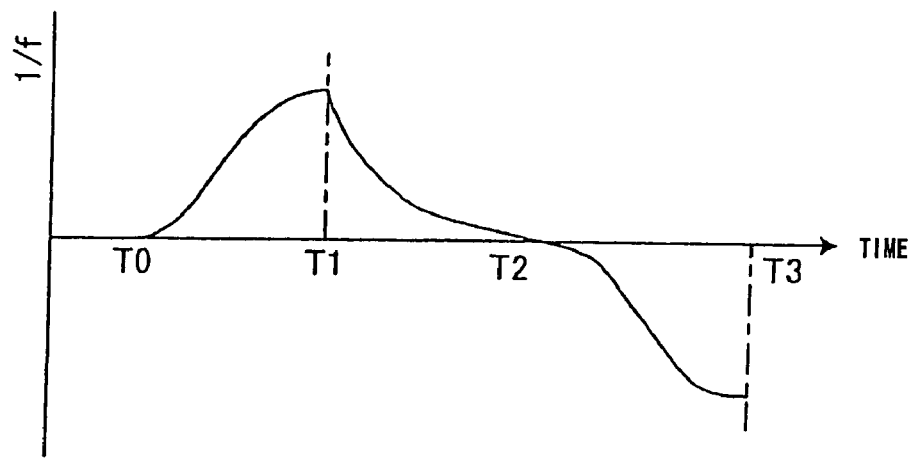

The liquid crystal lens 7 is, in the parallel glass state, in the convex lens state in which the lens power gradually becomes larger, in the convex lens state in which the lens power gradually becomes smaller, and in the concave lens state in which the lens power becomes larger gradually at the time T0, in the period from time T0 to time T1, in the period from time T1 to time T2, and in the period from time T2 to time T3 respectively. FIG. 9C is a chart showing the change in the inverse of the focal length f in the second pattern.

As shown in FIG. 9C, the value of 1/f becomes zero, the maximum positive value, zero, and the maximum negative value at times T0, T1, T2, and T3 respectively. Therefore, at time T1, the liquid crystal lens becomes in the convex lens state with the maximum lens power, and at time T3, it is in the concave lens state with the greatest lens power. Moreover, in the second pattern, the time required to complete the autofocus control is about 1.5 seconds in total.

Figure 10A:
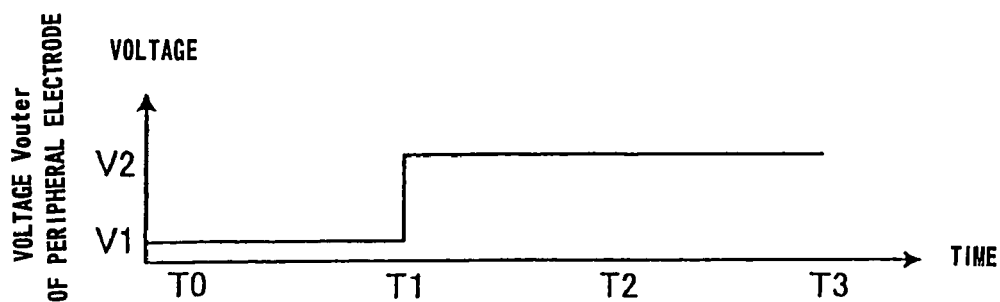
FIGS. 10A, 10B and 10C are diagrams showing a third voltage application pattern to the peripheral electrode and the core electrode of the liquid crystal lens, and change in inverse of the focal length respectively.
Figure 10B:

In the third pattern, as shown in FIGS. 10A and 10B, both the voltage Vouter of the peripheral electrode 22 and the voltage Vinner of the core electrode 20 are first set to the first voltage V1. Subsequently at time T0, only the voltage Vinner of the core electrode 20 is changed to the second voltage V2. Next, only the voltage Vouter of the peripheral electrode 22 is changed to the second voltage V2 at time T1. Then at the time T2, only the voltage Vinner of the core electrode 20 is changed to the first voltage V1, and the operation is terminated at time T3.

Figure 10C:
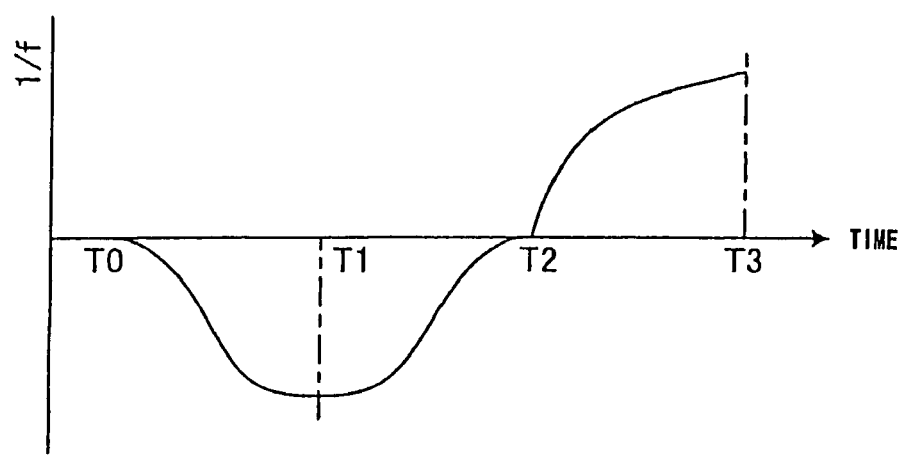

The liquid crystal lens 7 is in the parallel glass state, in the concave lens state in which the lens power gradually becomes larger, in the concave lens state in which the lens power gradually becomes smaller, and in the convex lens state in which the lens power gradually becomes larger at time T0, in the period from time T0 to time T1, in the period from time T1 to time T2, and in the period from time T2 to time T3 respectively. FIG. 10C is a chart showing the change in the inverse of the focal length in the third pattern.

As shown in FIG. 10C, the value of 1/f becomes zero, the maximum negative value, zero, and the maximum positive value at times T0, T1, T2, and T3 respectively. Therefore, at time T1, the liquid crystal lens becomes in the concave lens state with the maximum lens power, and at time T3, it is in the convex lens state with the largest lens power. Moreover, the time required to complete the autofocus control in the third pattern is about 1.5 seconds in total.

Figure 11A:
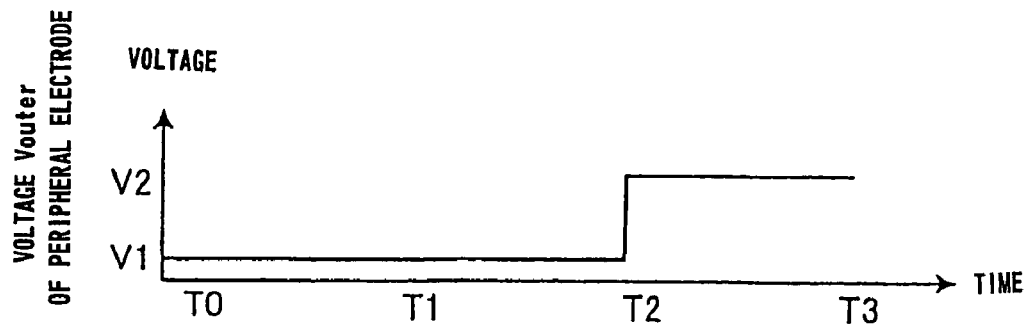
FIGS. 11A, 11B and 11C are diagrams showing a fourth voltage application pattern to the peripheral electrode and the core electrode of the liquid crystal lens, and change in inverse of the focal length respectively.
Figure 11B:
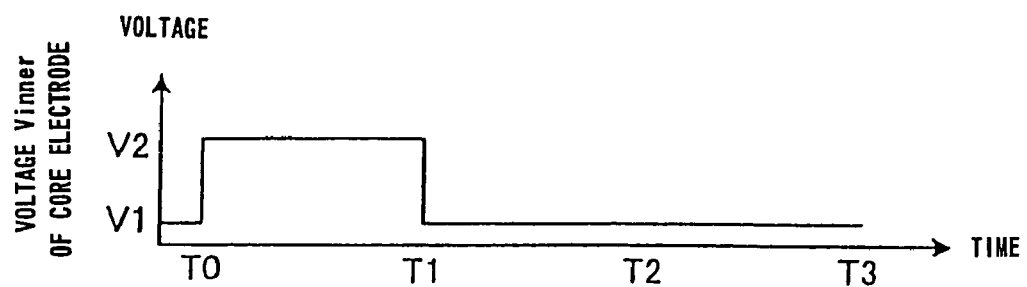

In the fourth pattern, as shown in FIGS. 11A and 11B, both the voltage Vouter of the peripheral electrode 22 and the voltage Vinner of the core electrode 20 are first set to the first voltage V1. Subsequently at the T0, only the voltage Vinner of the core electrode 20 is changed to the second voltage V2. Next, at time T1, only the voltage Vinner of the core electrode 20 is changed to the first voltage V1. Then, only the voltage Vouter of the peripheral electrode 22 is changed to the second voltage V2 at time T2, and the operation is terminated at time T3.

Figure 11C:
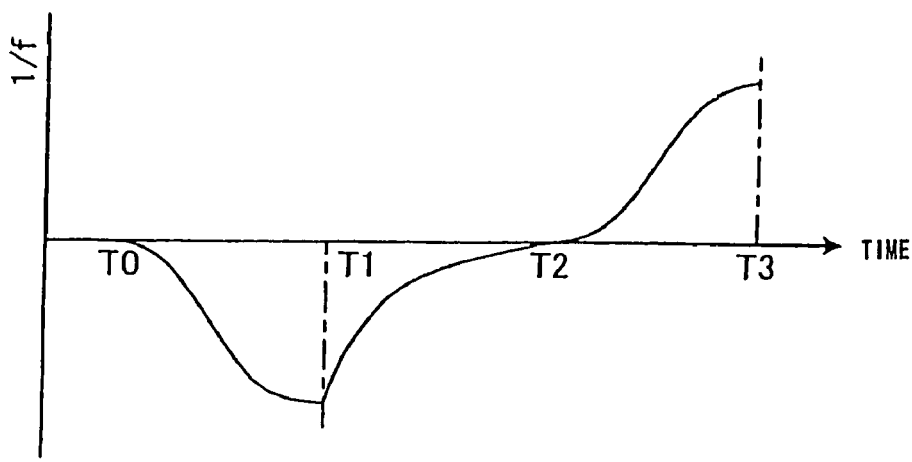

The liquid crystal lens 7 is in the parallel glass state, in the concave lens state in which the lens power gradually becomes larger, in the concave lens state in which the lens power gradually becomes smaller, and in the convex lens state in which the lens power gradually becomes larger at time T0, in the period from time T0 to time T1, in the period from time T1 to time T2, and in the period from time T2 to time T3 respectively. FIG. 11C is a chart showing the change of the inverse of the focal length in the fourth pattern.

As shown in FIG. 11C, the value of 1/f becomes zero, the maximum negative value, zero, and the maximum positive value at times T0, T1, T2, and T3 respectively. Therefore, the liquid crystal lens becomes in the concave lens state with the maximum lens power at time T1, and is in the convex lens state with the greatest lens power at the time T3. The time required to complete the autofocus control in the fourth pattern is about 1.5 seconds in total.

Figure 12A:
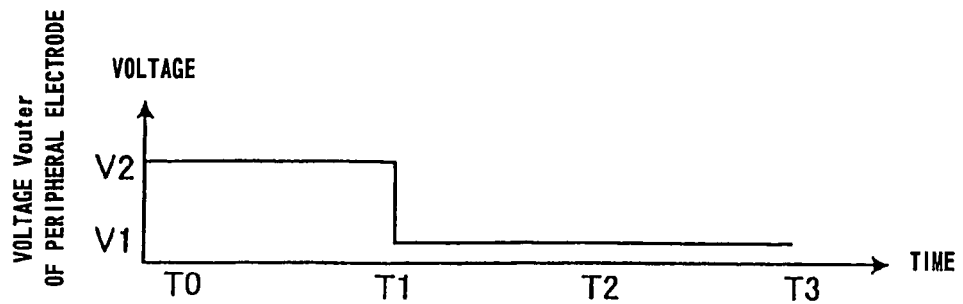
FIGS. 12A, 12B and 12C are diagrams showing a fifth voltage application pattern to the peripheral electrode and the core electrode of the liquid crystal lens, and change in inverse of the focal length respectively.
Figure 12B:
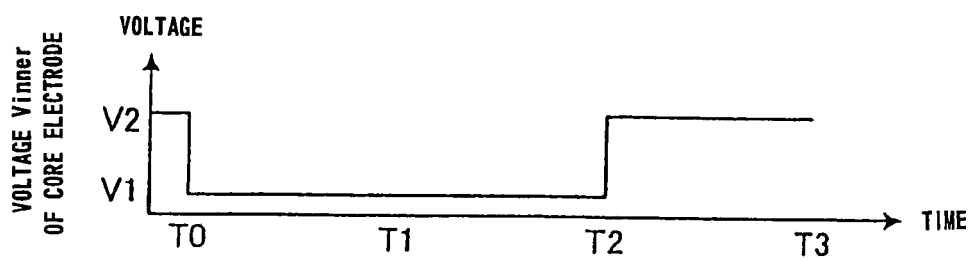

In the fifth pattern, as shown in FIGS. 12A and 12B, both the voltage Vouter of the peripheral electrode 22 and the voltage Vinner of the core electrode 20 are first set to the second voltage V2. Subsequently, at time T0, only the voltage Vinner of the core electrode 20 is changed to the first voltage V1. Next, at time T1, only the voltage Vouter of the peripheral electrode 22 is changed to the first voltage V1. Then, at time T2, only the voltage Vinner of the core electrode 20 is changed to the second voltage V2, and the operation is terminated at time T3.

Figure 12C:
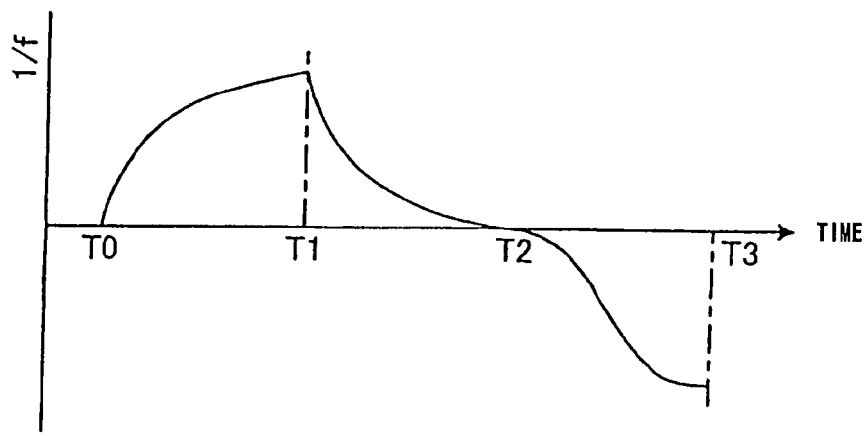

The liquid crystal lens 7 is in the parallel glass state, in the convex lens state in which the lens power gradually becomes larger, in the convex lens state in which the lens power gradually becomes smaller, and in the concave lens state in which the lens power becomes larger gradually at time T0, in the period from time T0 to time T1, in the period from time T1 to time T2, and in the period from time T2 to time T3 respectively. FIG. 12C is a chart showing the change in the inverse of the focal length f in the fifth pattern.

As shown in FIG. 12C, the value of 1/f becomes zero, the maximum positive value, zero, and the maximum negative value at times T0, T1, T2, and T3 respectively. Therefore, the liquid crystal lens becomes in the convex lens state with the maximum lens power at time T1, and is in the concave lens state with the maximum lens power at time T3. In the fifth pattern, the time required to complete the autofocus control is about 1.5 seconds in total.

Figure 13A:
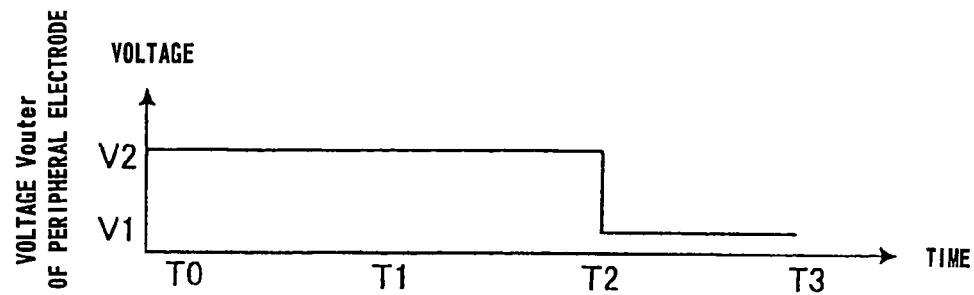
FIGS. 13A, 13B and 13C are diagrams showing a sixth voltage application pattern to the peripheral electrode and the core electrode of the liquid crystal lens, and change in inverse of the focal length respectively.
Figure 13B:
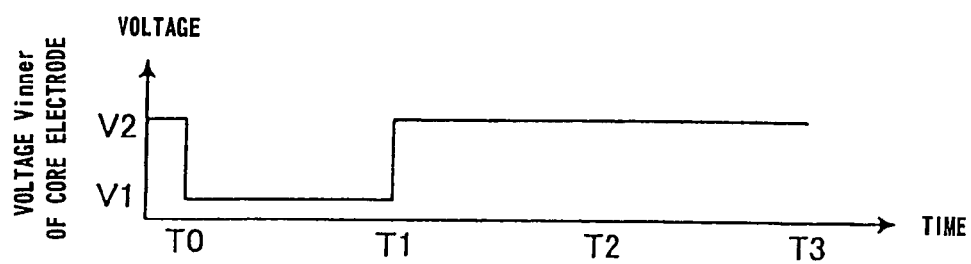

In the sixth pattern, as shown in FIGS. 13A and 13B, both the voltage Vouter of the peripheral electrode 22 and the voltage Vinner of the core electrode 20 are first set to the second voltage V2. Subsequently, at time T0, only the voltage Vinner of the core electrode 20 is changed to the first voltage V1. Next, at time T1, only the voltage Vinner of the core electrode 20 is changed to the second voltage V2. Then, at time T2, only the voltage Vouter of the peripheral electrode 22 is changed to the first voltage V1, and the operation is terminated at time T3.

Figure 13C:
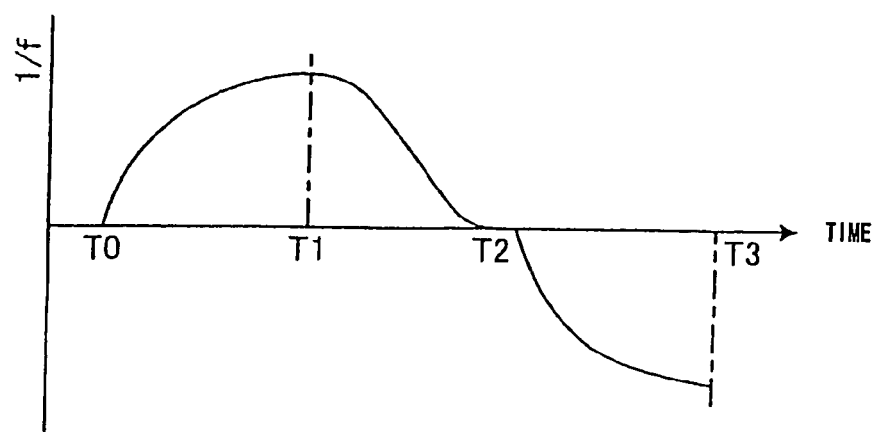

The liquid crystal lens 7 is in the parallel glass state in the convex lens state in which the lens power gradually becomes larger, in the convex lens state in which the lens power gradually becomes smaller, and in the concave lens in which the lens power gradually becomes larger at the time T0, in the period from the time T0 to the time T1, in the period from time T1 to time T2, and in the period from time T2 to time T3 respectively. FIG. 13C is a chart showing the change of the inverse of the focal length in the sixth pattern.

As shown in FIG. 13C, the value of 1/f becomes zero, the maximum positive value, zero, and the maximum negative value at times T0, T1, T2, and T3 respectively. Therefore, the liquid crystal lens becomes in the convex lens state with the maximum lens power at time T1, and is in the concave lens state with the greatest lens power at the time T3. The time required to complete the autofocus control in the sixth pattern is about 1.5 seconds in total.

Figure 14A:
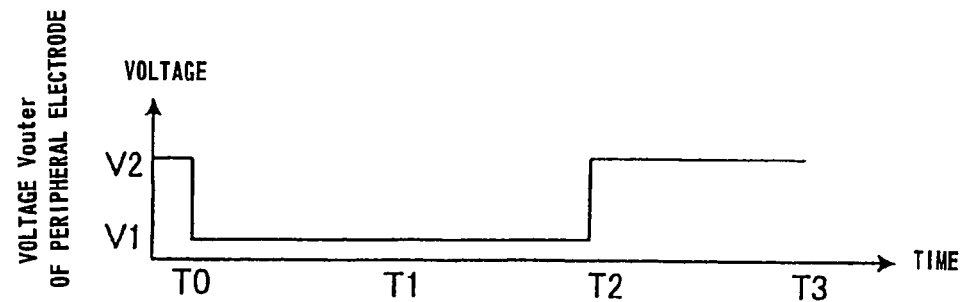
FIGS. 14A, 14B and 14C are diagrams showing a seventh voltage application pattern to the peripheral electrode and the core electrode of the liquid crystal lens, and change in inverse of the focal length respectively.
Figure 14B:
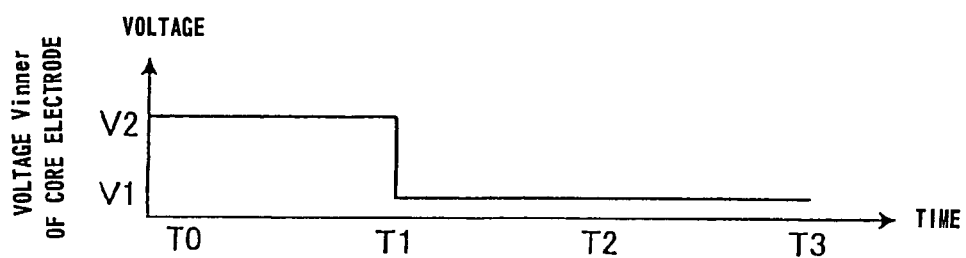

In the seventh pattern, as shown in FIGS. 14A and 14B, both the voltage Vouter of the peripheral electrode 22 and the voltage Vinner of the core electrode 20 are first set to the second voltage V2. Subsequently, at time T0, only the voltage Vouter of the peripheral electrode 22 is changed to the first voltage V1. Next, at time T1, only the voltage Vinner of the core electrode 20 is changed to the first voltage V1. Then, at time T2, only the voltage Vouter of the peripheral electrode 22 is changed to the second voltage V2, and the operation is terminated at time T3.

Figure 14C:
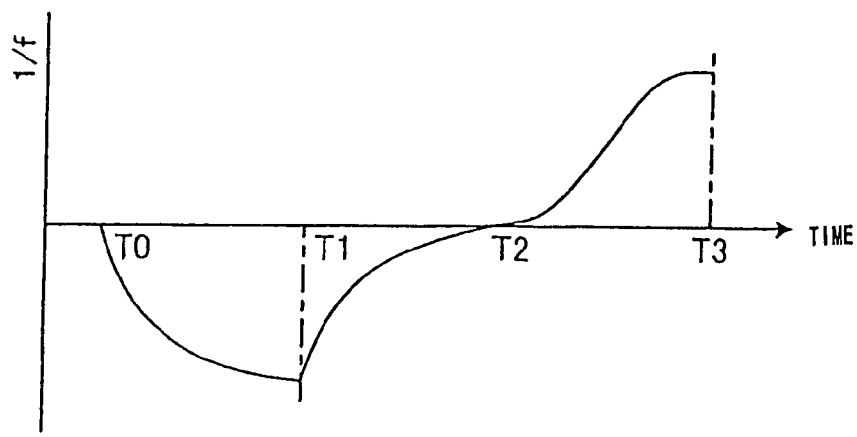

The liquid crystal lens 7 is in the parallel glass state, in the concave lens state in which the lens power gradually becomes larger, in the concave lens state in which the lens power gradually becomes smaller, and in the convex lens state in which the lens power gradually becomes larger at time T0, in the period from time T0 to time T1, in the period from time T1 to time T2, and in the period from time T2 to time T3 respectively. FIG. 14C is a chart showing the change of the inverse of the focal length f in the seventh pattern.

As shown in FIG. 14C, the value of 1/f becomes zero, the maximum negative value, zero, and the maximum positive value at times T0, T1, T2, and T3 respectively. Therefore, the liquid crystal lens becomes in the concave lens state with the maximum lens power at time T1, and it is in the convex lens state with the largest lens power at the time T3. In the seventh pattern, the time required to complete the autofocus control is about 1.5 seconds in total.

Figure 15A:
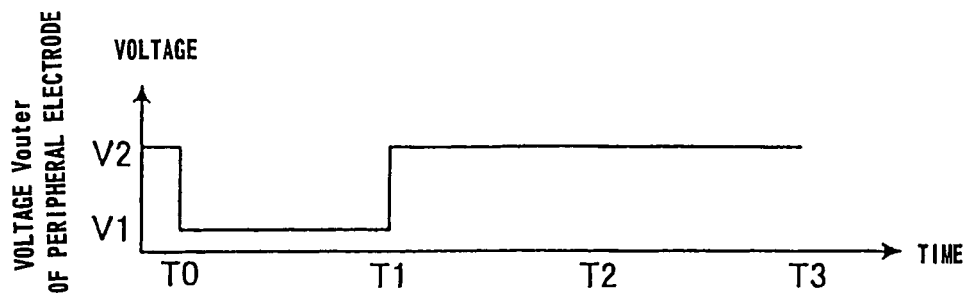
FIGS. 15A, 15B and 15C are diagrams showing a eighth voltage application pattern to the peripheral electrode and the core electrode of the liquid crystal lens, and change in inverse of the focal length respectively.
Figure 15B:
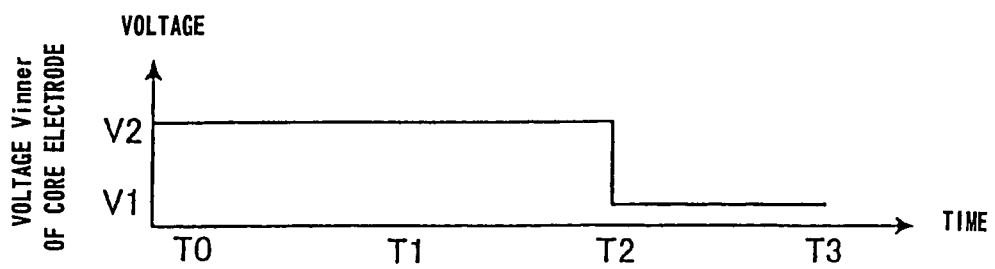

In the eighth pattern, as shown in FIGS. 15A and 15B, both the voltage Vouter of the peripheral electrode 22 and the voltage Vinner of the core electrode 20 are first set to the second voltage V2. Subsequently, at time T0, only the voltage Vouter of the peripheral electrode 22 is changed to the first voltage V1. Next, at time T1, only the voltage Vouter of the peripheral electrode 22 is changed to the second voltage V2. Then, at time T2, only the voltage Vinner of the core electrode 20 is changed to the first voltage V1, and the operation is terminated at time T3.

Figure 15C:
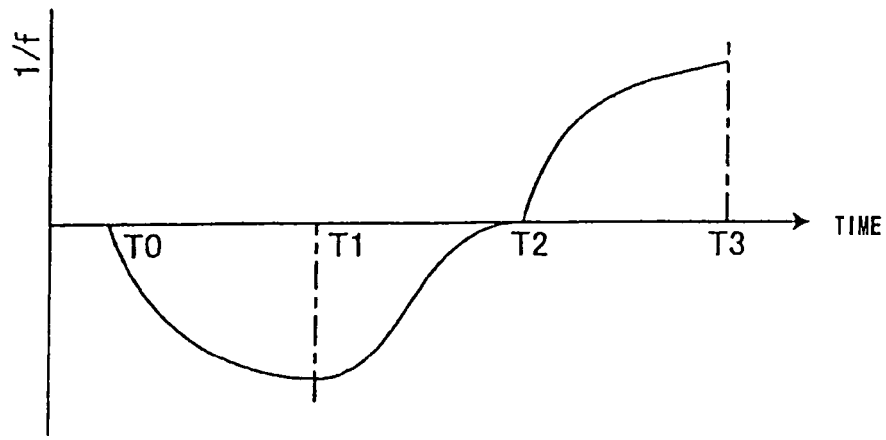

The liquid crystal lens 7 is in the parallel glass state, in the concave lens state in which the lens power gradually becomes larger, in the concave lens state in which the lens power gradually becomes smaller, and in the convex lens state in which the lens power gradually becomes larger at a time T0, in the period from time T0 to time T1, in the period from time T1 to time T2, and in the period from time T2 to time T3 respectively. FIG. 15C is a chart showing the change of the inverse of the focal length f in the eighth pattern.

As shown in FIG. 15C, the value of 1/f becomes zero, the maximum negative value, zero, and the maximum positive value at times T0, T1, T2, and T3 respectively. Therefore, the liquid crystal lens becomes in the concave lens state with the maximum lens power at time T1, and is in the convex lens state with the largest lens power at the time T3. In the eighth pattern, the time required to complete the autofocus control is about 1.5 seconds in total.

Figure 16A:
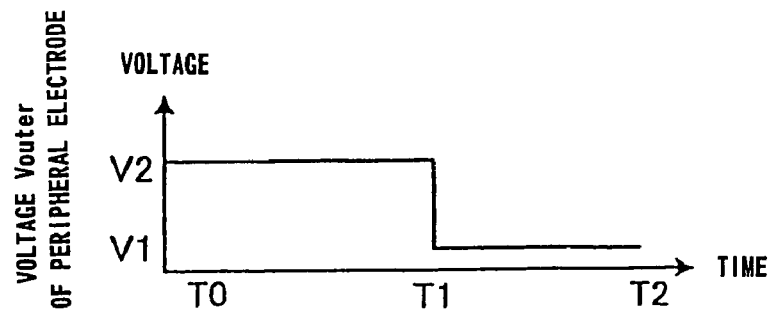
FIG. 16A, 16B and 16C are diagrams showing a ninth voltage application pattern to the peripheral electrode and the core electrode of the liquid crystal lens, and change in inverse of the focal length respectively.
Figure 16B:
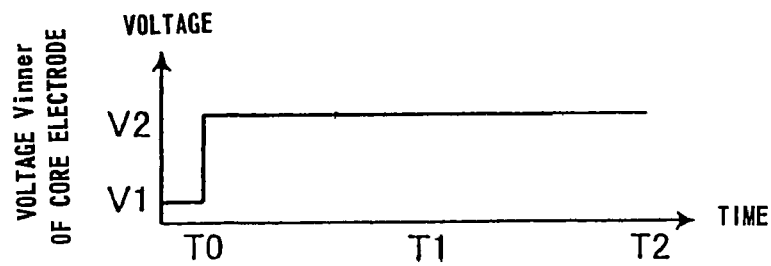

In the ninth pattern, as shown in FIGS. 16A and 16B, first, the voltage Vouter of the peripheral electrode 22 is set to the second voltage V2, and the voltage Vinner of the core electrode 20 is set to the first voltage V1. Subsequently, at time T0, only the voltage Vinner of the core electrode 20 is changed to the second voltage V2. Then, at time T1, only the voltage Vouter of the peripheral electrode 22 is changed to the first voltage V1, and the operation is terminated at time T2.

Figure 16C:
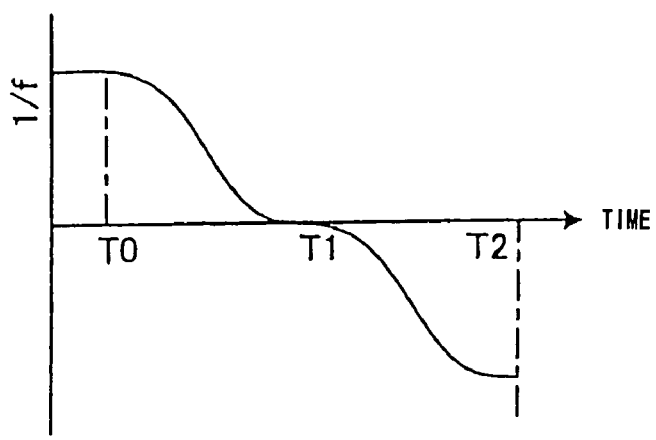

The liquid crystal lens 7 is in the convex lens state with the maximum lens power, in the convex lens state in which the lens power gradually becomes smaller, and in the concave lens state in which the lens power gradually becomes larger at time T0, in the period from time T0 to time T1, and in the period from time T1 to time T2 respectively. FIG. 16C is a chart showing the change of the inverse of the focal length f in the ninth pattern.

As shown in FIG. 16C, the value of 1/f is the maximum positive value at time T0. Then, from time T0 to time T1, the value changes along an upward convex curve, and then along a downward convex curve after passing the inflection point, and becomes zero at time T1. Between time T1 and time T2, the value of 1/f changes along an upward convex curve, and then along a downward convex curve after passing an inflection point to reach the maximum negative value. Therefore, at time T2, the liquid crystal lens becomes to be in the concave lens state with the maximum lens power. In the ninth pattern, the time required to complete the autofocus control is about 1.0 s in total.

Figure 17A:
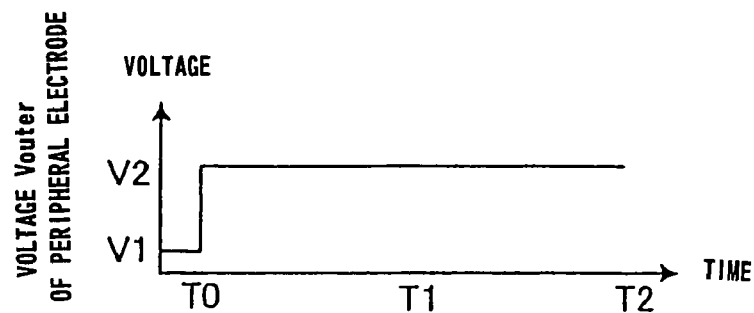
FIGS. 17A, 17B and 17C are diagrams showing a tenth voltage application pattern to the peripheral electrode and the core electrode of the liquid crystal lens, and change in inverse of the focal length respectively.
Figure 17B:
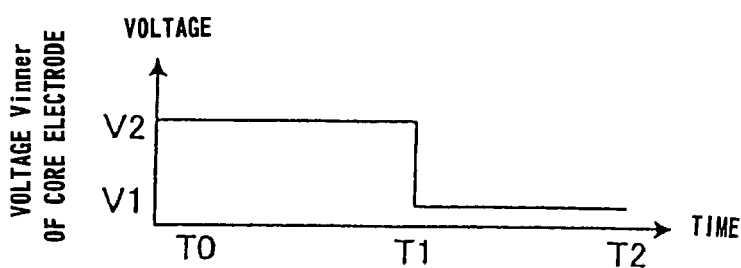

In the tenth pattern, as shown in FIGS. 17A and 17B, first, the voltage Vouter of the peripheral electrode 22 is set to the first voltage V1, and the voltage Vinner of the core electrode 20 is set to the second voltage V2. Subsequently, at time T0, only the voltage Vouter of the peripheral electrode 22 is changed to the second voltage V2. Then, at time T1, only the voltage Vinner of the core electrode 20 is changed to the first voltage V1, and the operation is terminated at time T2.

Figure 17C:
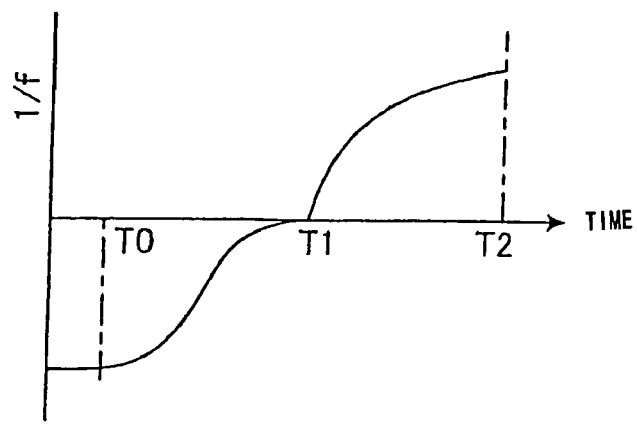

The liquid crystal lens 7 is in the concave lens state with the maximum lens power, in the concave lens state in which the lens power gradually becomes smaller, and in the convex lens state in which the lens power gradually becomes larger at time T0, in the period from time T0 to time T1, and in the period from time T1 to time T2 respectively. FIG. 17C is a chart showing the change of the inverse of the focal length f in the tenth pattern.

As shown in FIG. 17C, the value of 1/f is the maximum negative value, zero, and the maximum positive value at times T0, T1, and T2 respectively. Therefore, at time T2, the liquid crystal lens is in the convex lens state with the maximum lens power. In the tenth pattern, the time required to complete the autofocus control is about 1.0 second in total.

Figure 18A:
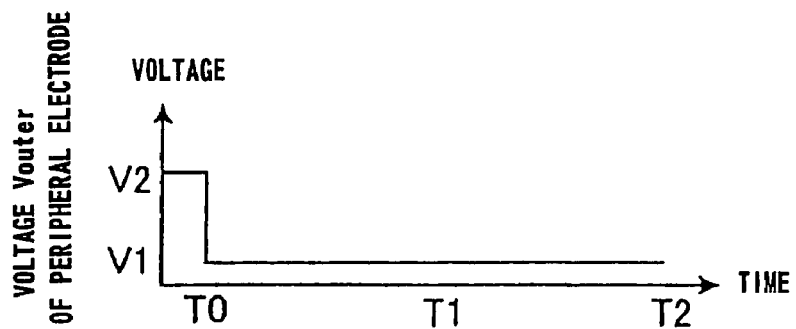
FIGS. 18A, 18B and 18C are diagrams showing a eleventh voltage application pattern to the peripheral electrode and the core electrode of the liquid crystal lens, and change in inverse of the focal length respectively.
Figure 18B:
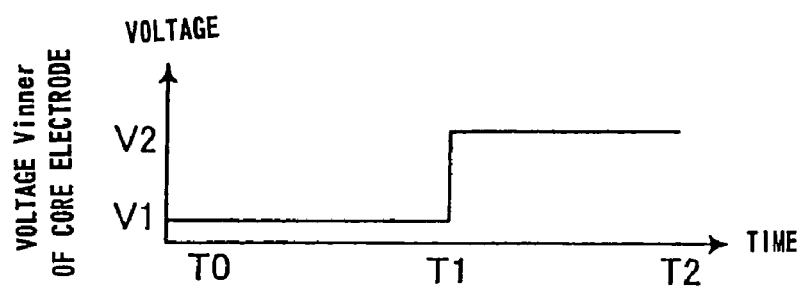

In the eleventh pattern, as shown in FIGS. 18A and 18B, first, the voltage Vouter of the peripheral electrode 22 is set to the second voltage V2, and the voltage Vinner of the core electrode 20 is set to the first voltage V1. Subsequently, at the time T0, only the voltage Vouter of the peripheral electrode 22 is changed to the first voltage V1. Then, at time T1, only the voltage Vinner of the core electrode 20 is changed to the second voltage V2, and the operation is terminated at time T2.

Figure 18C:
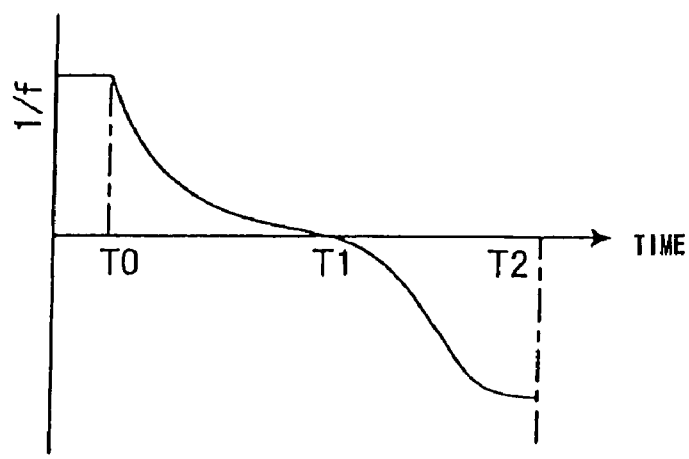

The liquid crystal lens 7 is in the convex lens state with the maximum lens power, in the convex lens state in which the lens power gradually becomes smaller, and in the concave lens state in which the lens power gradually becomes larger at time T0, in the period from time T0 to time T1, and in the period from time T1 to time T2 respectively. FIG. 18C is a chart showing the change of the inverse of the focal length in the eleventh pattern.

As shown in FIG. 18C, the value of 1/f is the maximum positive value, zero, and the maximum negative value at times T0, T1, and T2 respectively. Therefore, at time T2, the liquid crystal lens is in the concave lens state with the maximum lens power. In the eleventh pattern, the time required to complete the autofocus control is about 1.0 second in total.

Figure 19A:
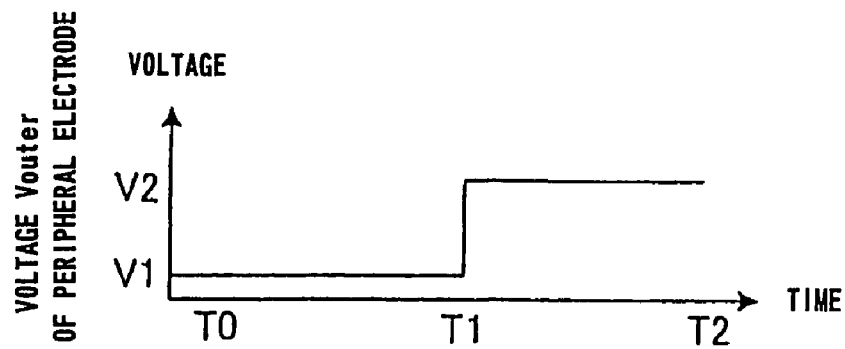
FIGS. 19A, 19B and 19C are diagrams showing a focal length in the twelfth voltage application pattern to the peripheral electrode and the core electrode of the liquid crystal lens, and change in inverse of the focal length respectively.
Figure 19B:
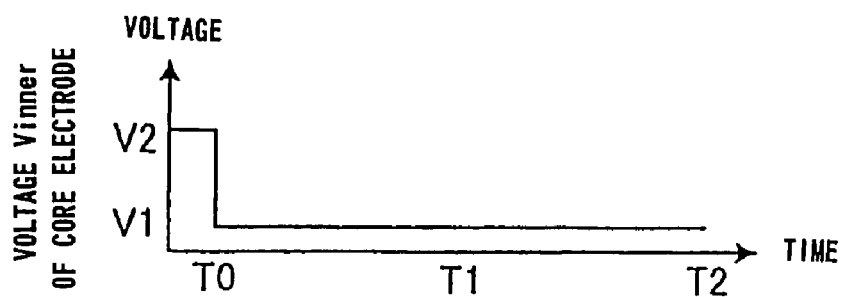

In the twelfth pattern, as shown in FIGS. 19A and 19B, first, the voltage Vouter of the peripheral electrode 22 is set to the first voltage V1, and the voltage Vinner of the core electrode 20 is set to the second voltage V2. Subsequently, at time T0, only the voltage Vinner of the core electrode 20 is changed to the first voltage V1. Then, at time T1, only the voltage Vouter of the peripheral electrode 22 is changed to the second voltage V2, and the operation is terminated at time T2.

Figure 19C:
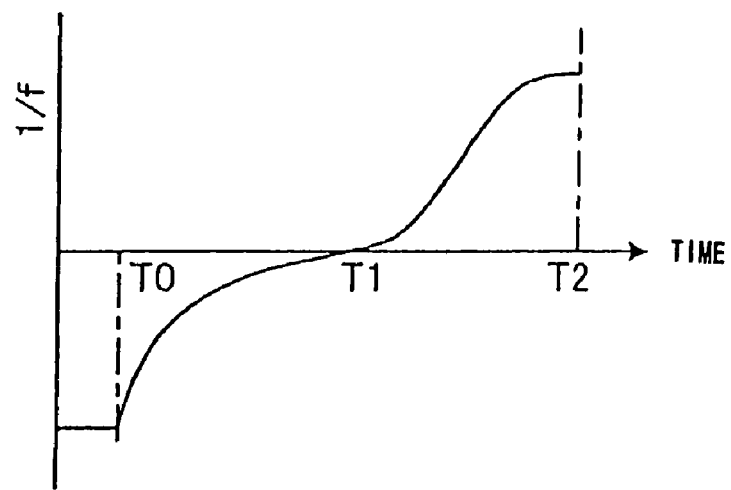

The liquid crystal lens 7 is in the concave lens state with the maximum lens power, in the concave lens state in which the lens power gradually becomes smaller, and in the convex lens state in which the lens power gradually becomes larger at time T0, in the period from time T0 to time T1, and in the period from time T1 to time T2 respectively. FIG. 19C is a chart showing the change of the inverse of the focal length f in the twelfth pattern.

As shown in FIG. 19C, the value of 1/f is the maximum negative value, zero, and the maximum positive value at times T0, T1, and T2 respectively. Therefore, at time T2, the liquid crystal lens is in the convex lens state with the maximum lens power. In the twelfth pattern, the time required to complete the autofocus control is about 1.0 second in total.

Next, an evaluation of plural autofocus signals (focus signals) obtained both when the liquid crystal lens 7 is put into the convex lens state and when the liquid crystal lens 7 is put into the concave lens state, will be explained. Here, it is not particular limited, but it is assumed that a photographic subject at a distance L of 200 mm is adjusted to be in focus by the optical lens system 2 in the configuration shown in FIG. 1 without the liquid crystal lens system 1.

Therefore, in the configuration shown in FIG. 1, when the distance L to the photographic subject is shorter than 200 mm, the liquid crystal lens 7 is put into the convex lens state, while when the distance L to a photographic subject is longer than 200 mm, the liquid crystal lens 7 is put into the concave lens state. As described above, in the first embodiment, in the case when the liquid crystal lens 7 is in the convex lens state, the focal length f is expressed with a positive value, and in the case when the liquid crystal lens 7 is in the concave lens state, the focal length is expressed with a negative value.

Accordingly, in the convex lens state, the power of the liquid crystal lens 7 becomes weaker along with the change of the value f, for example, from 100 mm to 200 mm, 500 mm and 1000 mm, and in the concave lens sate the power of the liquid crystal lens 7 becomes weaker along with the change of f value, for example, from −100 mm to −200 mm, −500 mm and −1000 mm.

Figure 20:
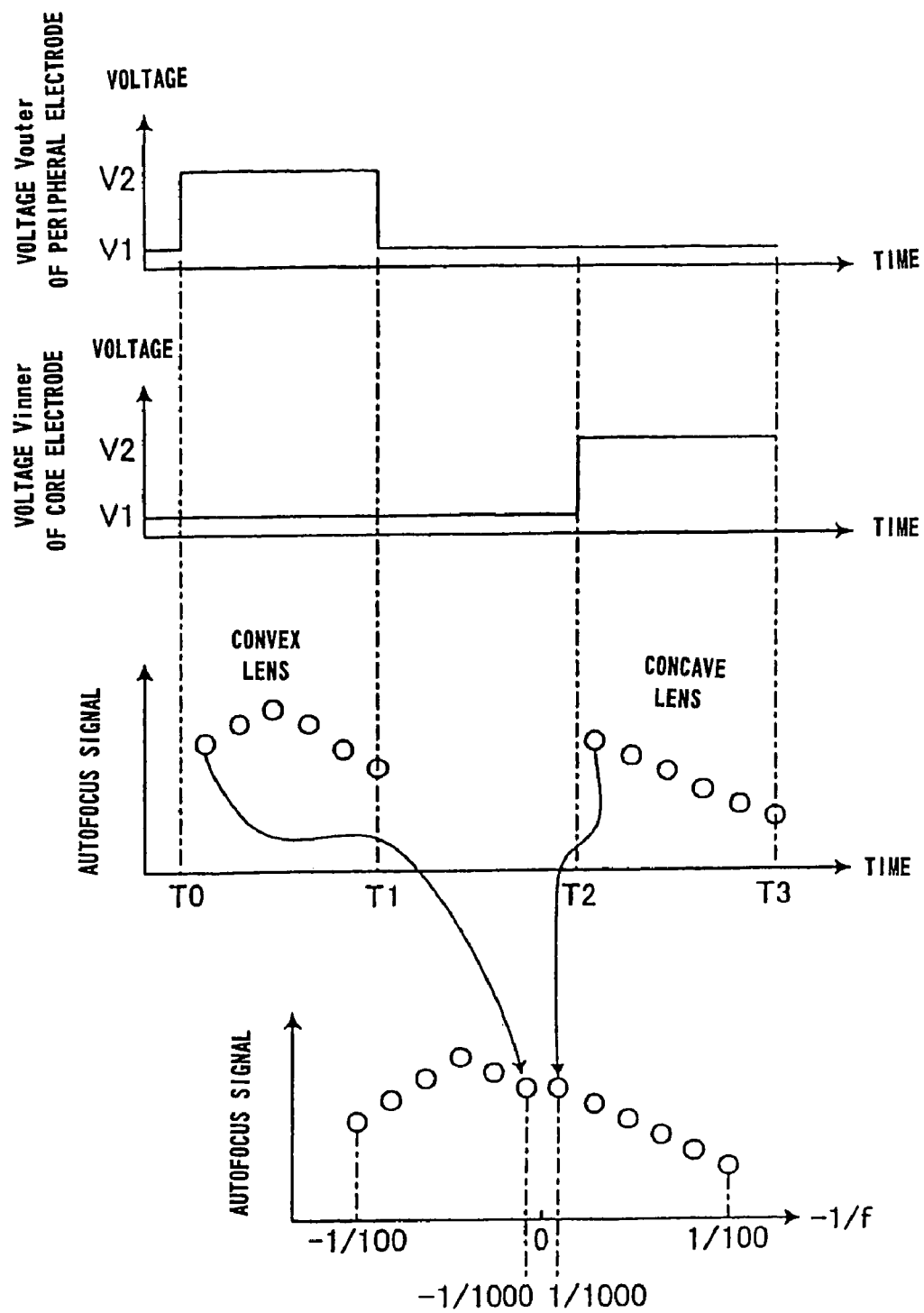
FIGS. 20 to 23 are explanatory diagrams showing each different example of a method of evaluation of the focus signals.
Figure 21:
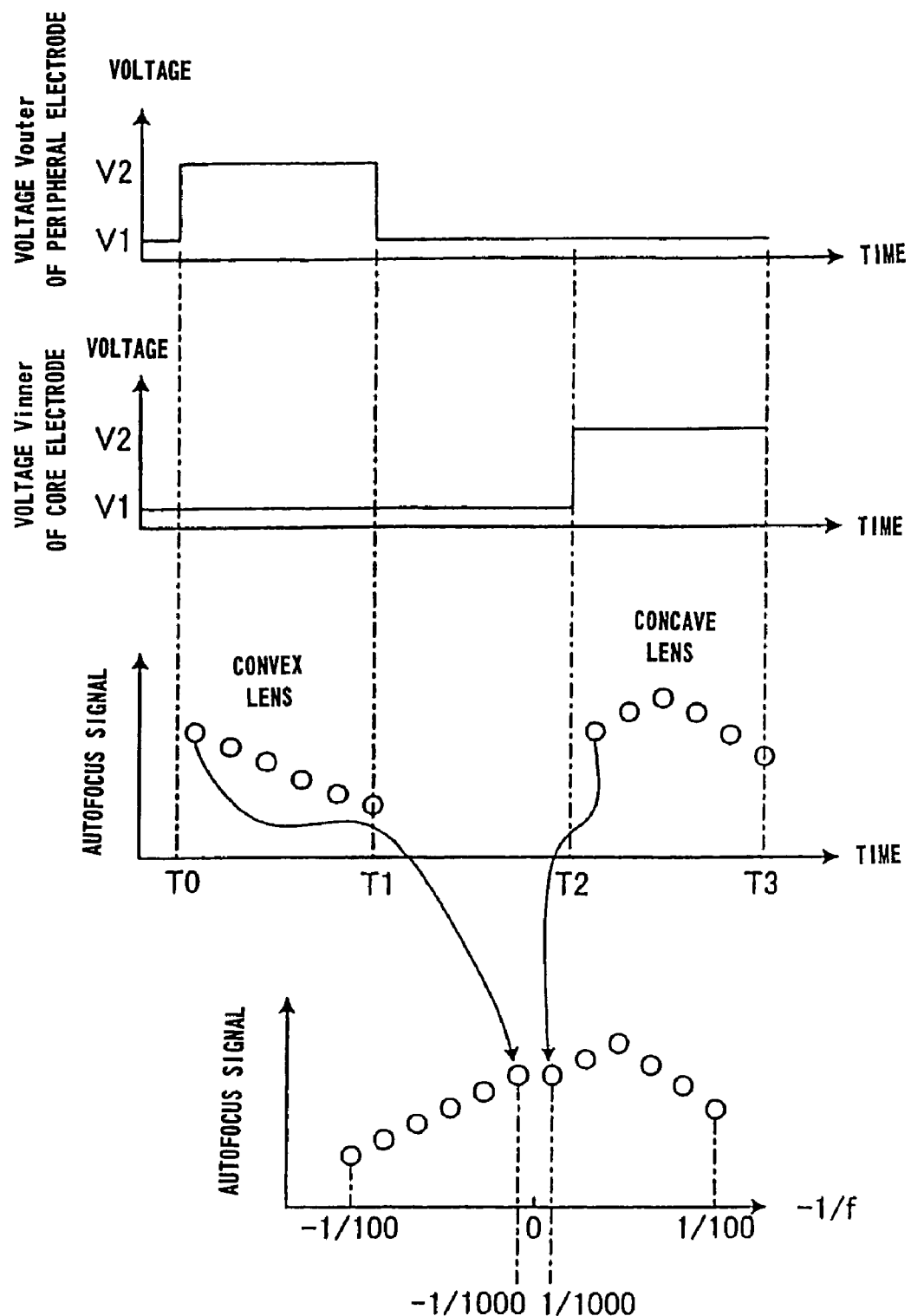

Explanation will be given taking the above mentioned second voltage application pattern as an example. FIGS. 20 and 21 are explanatory diagrams illustrating a method of evaluation of the autofocus signals in the second voltage application pattern. As shown in FIG. 20 or 21, in the second voltage application pattern, during the period from time T0 to time T1 when the liquid crystal lens 7 is in the convex lens state, plural autofocus signals, six autofocus signals in the example illustrated although not particularly limited thereto, are obtained.

In the period from time T2 to time T3 when the liquid crystal lens 7 is in the state of the concave lens, plural autofocus signals, six autofocus signals in the illustrated example although not particularly limited to it, are obtained. At that time, sampling is started with a little delay after the time of changing the voltage Vouter of the peripheral electrode 22 or the voltage Vinner of the core electrode 20.

The example shown in the upper side among the autofocus signals of FIG. 20 is a case where the distance L to a photographic subject is shorter than 200 mm, for example, 170 mm. Therefore, when the liquid crystal lens 7 is in the convex lens state, the autofocus signal becomes the maximum. For convenience, the inverse of the focal length f with reversed positive/negative sign, i.e., the value of −1/f is used.

When plural autofocus signals obtained by the sampling during the transient response operation period of the liquid crystal lens 7 are arranged in order based on the values of −1/f from the negative value having the largest absolute value to the positive value having the largest absolute value, the autofocus signals are expressed as shown on the lowest portion of FIG. 20. In this illustrated example, it can be seen that the autofocus signals are sampled in the range of the −1/f values from −1/100 to 1/100. Also it can be seen that at a value of −1/f between −1/100 and −1/1000, the autofocus signal becomes maximum.

The example shown in the lower side among the autofocus signals of FIG. 21 is a case where the distance L to a photographic subject is longer than 200 mm, for example, 350 mm. Therefore, the autofocus signal is the maximum when the liquid crystal lens 7 is in the concave lens state. When plural autofocus signals obtained by the sampling during the transient response operation period of the liquid crystal lens 7 are arranged in order based on −1/f from the negative value having the largest absolute value to the positive value having the largest absolute value, the autofocus signals are expressed as shown in the figure.

Also in this illustrated example it can be seen that the autofocus signals are sampled for the value −1/f in the range from −1/100 to 1/100. It can also be seen that at the value of −1/f between 1/100 and 1/1000, the autofocus signal becomes maximum. In either case, after all the samplings of the autofocus signals have been completed, the levels of all the autofocus signals are compared, and the maximum among them is judged.

The same may hold, in the cases of the first and the third to the eighth voltage application patterns described above. The principle of the contour detection system in which the autofocus signal becomes the maximum when a photographic subject is in focus is public known, so that the explanation is omitted here.

Figure 22:
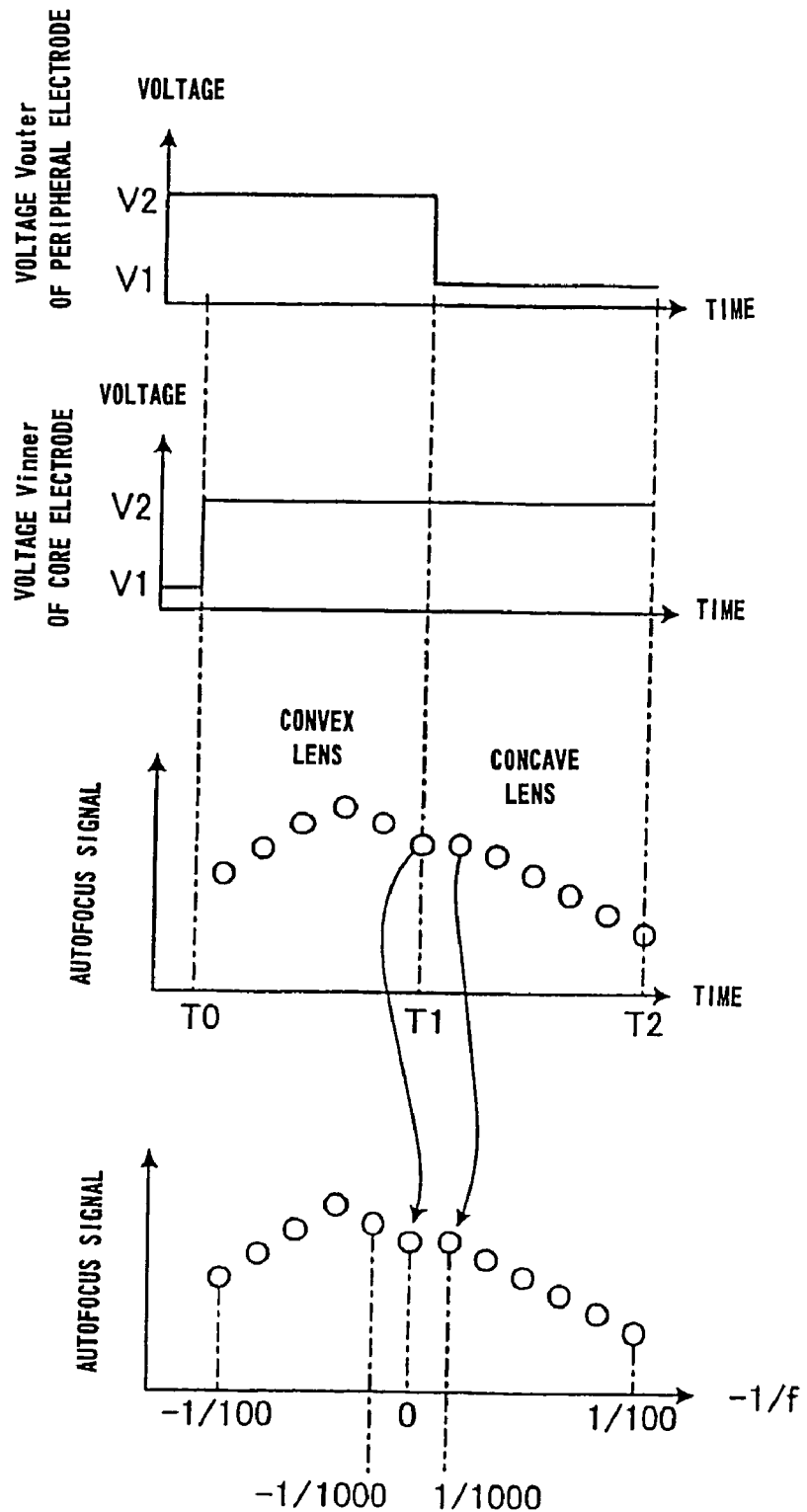
Figure 23:
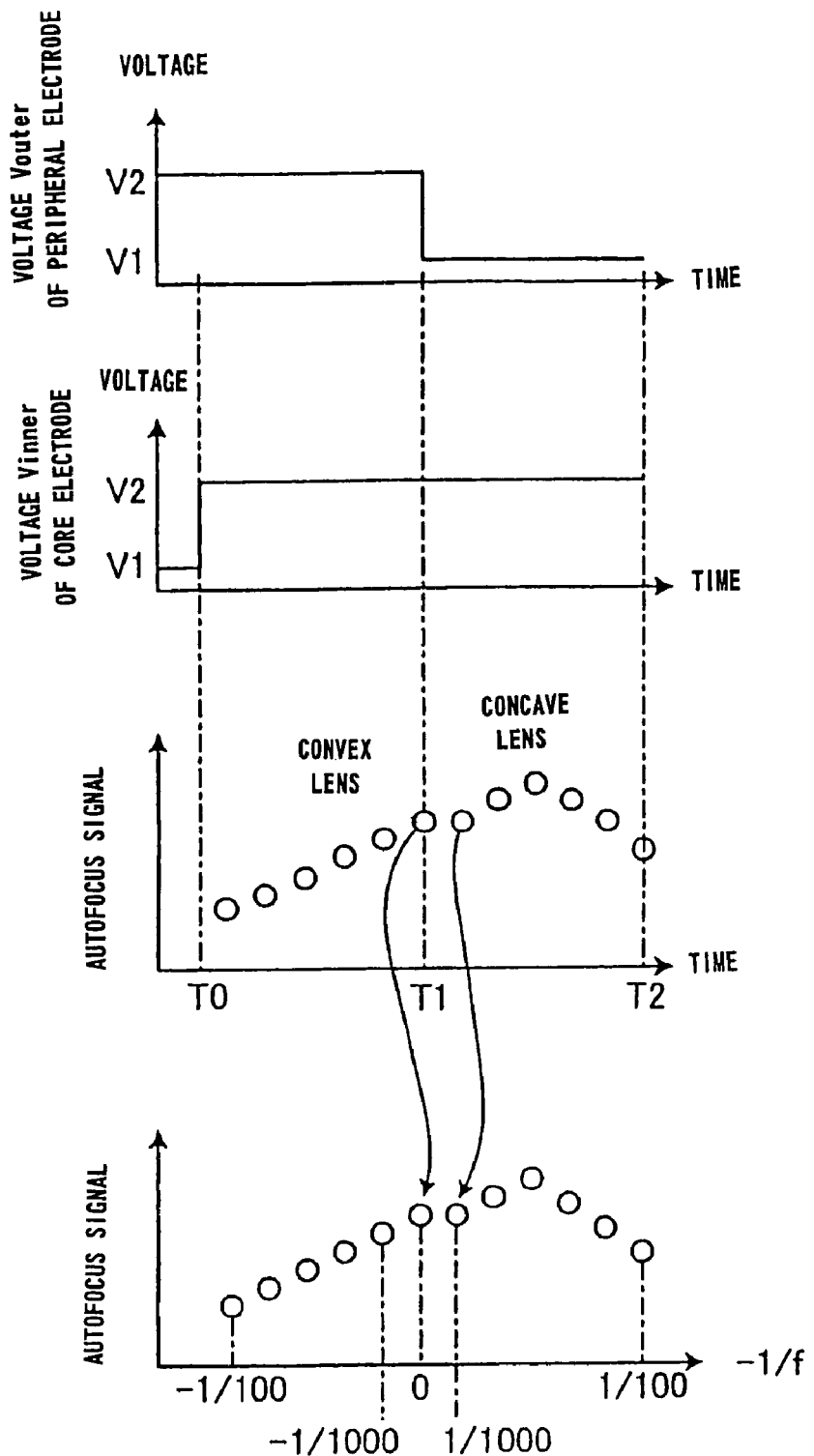

As another example, the procedures of evaluation of the autofocus signals in the ninth voltage application pattern are shown in FIGS. 22 and 23. The example shown in FIG. 22 is a case where the distance L to a photographic subject is shorter than 200 mm, for example, 170 mm. The example shown in FIG. 23 is a case where the distance L to a photographic subject is longer than 200 mm, for example, 350 mm. When plural autofocus signals obtained by the sampling during the transient response operation period of the liquid crystal lens 7 are arranged in order based on the values of $-1/f$ from the negative value having the largest absolute value to the positive value having the largest absolute value, the autofocus signals are expressed as shown in FIG. 22 or 23 on the lower side respectively.

Also, in these illustrated examples, it can be seen that the autofocus signals are sampled for $-1/f$ values in the range of $-1/100$ to $1/100$. After all the samplings of the autofocus signals have been completed, the levels of all the autofocus signals are compared and the maximum value thereof is judged. The same may hold in the cases of the tenth to twelfth voltage application patterns.

Any of the voltage application patterns may be adopted. For example, when the first, second, fifth, sixth, ninth, or eleventh voltage application pattern is adopted, if the distance L to a photographic subject is shorter than 200 mm, the maximum value of the autofocus signal is obtained within the period (T0 to T1) where the liquid crystal lens 7 is in the convex lens state. In that case, the operation within the period of T1 to T2 and T2 to T3 thereafter may be cancelled.

Moreover, for example, when the third, fourth, seventh, eighth, tenth, or twelfth voltage application pattern is adopted, if the distance L to a photographic subject is longer than 200 mm, the maximum of the autofocus signal is obtained within the period (T0 to T1) where the liquid crystal lens 7 is in the concave lens state. In that case, the operation within the periods of T1 to T2 and T2 to T3 thereafter may be cancelled.

Thus, to detect that the maximum of the autofocus signal is obtained when the liquid crystal lens 7 has experienced only either of the periods of the convex lens state and of the concave lens state, the maximum value of the autofocus signal is judged at the time of obtaining the plural autofocus signals only within either of the periods. Then, it is judged whether the maximum value obtained as a result of the judgment is larger than the respective autofocus signal levels obtained at the sampling timings just before and just after the sampling timing at which the maximum was obtained.

As explained above, a predetermined voltage is applied to the liquid crystal lens, plural focus signals (autofocus signals as described above) are sampled during the period when the liquid crystal lens is carrying out the transient response operation affected by the applied voltage, and the maximum of the focus signal is obtained based on those plural focus signals. The level of the focus signal becomes the maximum when the photographic subject is in focus, and becomes smaller as the degree of focus mismatching (degree of blurriness) becomes stronger. Therefore, it is not necessary to change the voltage applied to liquid crystal stepwise and to sample focus signals after waiting until the response of the liquid crystal is stabilized at each time, and thus the focus point can be detected in a short time.

Also, the voltage applying unit applies, as the predetermined voltage, a first voltage to bring the liquid crystal lens into the convex lens state, and a second voltage to bring the liquid crystal lens into the concave lens state at different timings. The voltage applying unit applies the voltage to the liquid crystal lens in a way so that there is a period to apply a third voltage that is neither the voltage for putting the liquid crystal lens into the convex lens state nor the voltage for putting into the concave lens state, between the period of application of the first voltage and the period of application of the second voltage to the liquid crystal lens. For this reason, it is effective in both cases where the distance to a photographic subject is shorter and longer than the predetermined distance on which the focus is adjusted beforehand without using adjustment of the focal length by the liquid crystal lens.

Moreover, if the liquid crystal lens control unit judges that the focus signal is maximum during the period when the liquid crystal lens is carrying out the transient response operation after either the first voltage or the second voltage is applied to the liquid crystal lens, the liquid crystal lens control unit cancels application of the other voltage to a liquid crystal lens. As a result, the time required to detect the focus point becomes half.

The liquid crystal lens 7 may operate only in the convex lens state. In this case, for example, in the configuration shown in FIG. 1 without the liquid crystal lens system 1, although it is not particularly limited, the optical lens system 2 adjusts the distance L to a photographic subject in focus to 60 cm. When the distance L to a photographic subject is shorter than 60 cm, the liquid crystal lens 7 is put into the convex lens state to adjust the focus on the subject. Others are similar to the above-mentioned case.

Figure 24A:
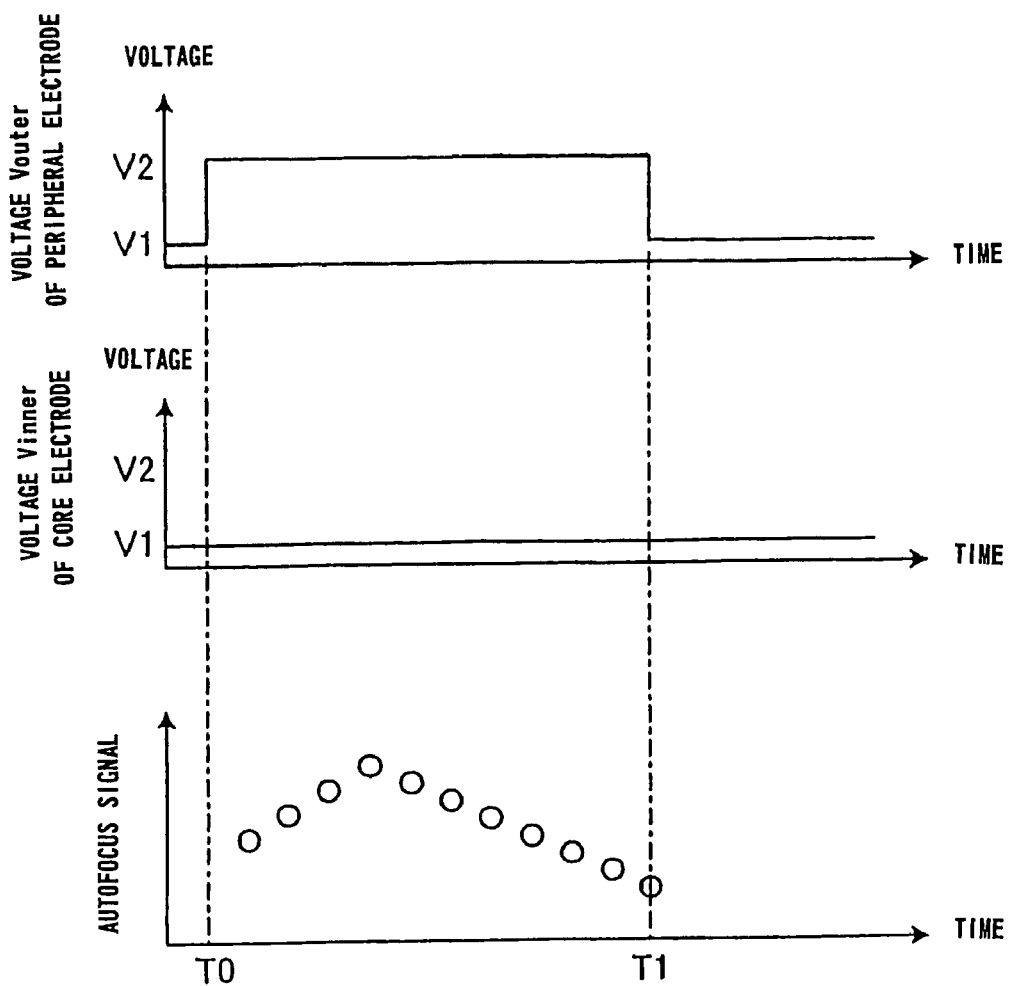
FIGS. 24A and 24B are explanatory diagrams showing other examples of the method of evaluation of the focus signals.
Figure 24B:
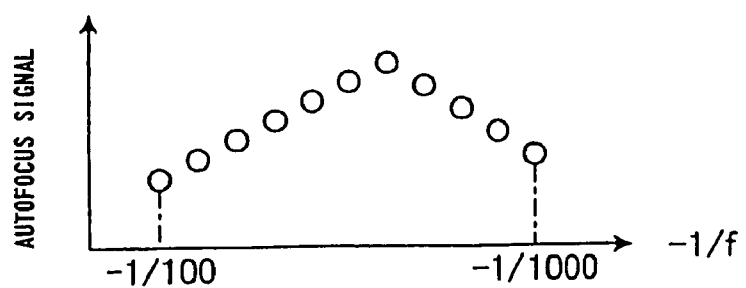

FIGS. 24A and 24B are an explanatory diagram showing the method of evaluation of the autofocus signals in this case. As shown in FIG. 24A, in the period from time T0 to time T1 when the liquid crystal lens 7 is in the convex lens state, eleven autofocus signals (focus signals) in the illustrated example although not particularly restricted, are obtained.

In the same way as the above-mentioned case, when these 11 plots are arranged in the order based on the value of $-1/f$, they are as shown in FIG. 24B. Also in this example, the levels of all the autofocus signals are compared and their maximum is judged after all the samplings of the autofocus signals have been completed. In addition, in the example, the sampling period ts is shorter than in the above-mentioned example.

According to this example, the voltage applying unit is effective when the distance to a photographic subject is shorter than the predetermined distance where the focus has been adjusted beforehand without using the adjustment of the focal length by the liquid crystal lens, because the voltage applying unit applies the voltage, as the predetermined voltage, to bring the liquid crystal lens into the convex lens state.

The liquid crystal lens 7 may operate only in the concave lens state. In this case, for example, in the configuration shown in FIG. 1 without the liquid crystal lens system 1, although not particularly limited, the optical lens system 2 adjusts the distance L to a photographic subject in focus to 5 cm. When the distance L to the photographic subject is longer than 5 cm, the liquid crystal lens 7 is made into the concave lens state to adjust the focus. Others are the same as in the case of the first example.

According to the embodiment, the voltage applying unit is effective when the distance to a photographic subject is longer than the predetermined distance where the focus has been set beforehand without depending on the adjustment of the focal length by the liquid crystal lens, because the voltage applying unit applies the voltage, as the predetermined voltage, for changing the liquid crystal lens into the concave lens state.

The automatic focusing apparatus according to the present invention not merely applies the driving voltage to the pattern electrodes formed in the liquid crystal lens by the voltage applying unit, but includes a modulating unit that eliminates the delay in a transient response operation in a region of the liquid crystal on which the smaller driving voltage among the driving voltages is applied, and applies this predetermined driving voltage (specifically, for example, pulse height modulation (PHM) voltage so that the maximum focus signal may enable to judged by means of a focus point judging unit using plural focus signal data obtained by performing sampling of the focus signals at predetermined cycles, when the liquid crystal is in the transient response operation.

By constituting such an automatic focusing apparatus, due to the effect to make the response of the liquid crystal on the low-voltage-applied-side in the liquid crystal lens quicker, the focus point can be obtained using a suitable refractive index distribution also during the transient response of liquid crystal.

As for the outline configuration of the automatic focusing apparatus according to the embodiment, explanation thereof is omitted, since it is the same as that of the automatic focusing apparatus shown in FIG. 1. As for the configuration of a liquid crystal lens system 1 and configuration of the pattern electrode with which the liquid crystal lens 7 is equipped and operation of this liquid crystal lens, description thereof is also omitted, since it is the same as that of the automatic focusing apparatus according to the above-mentioned embodiment shown in FIGS. 2 and 4.

Figure 25:
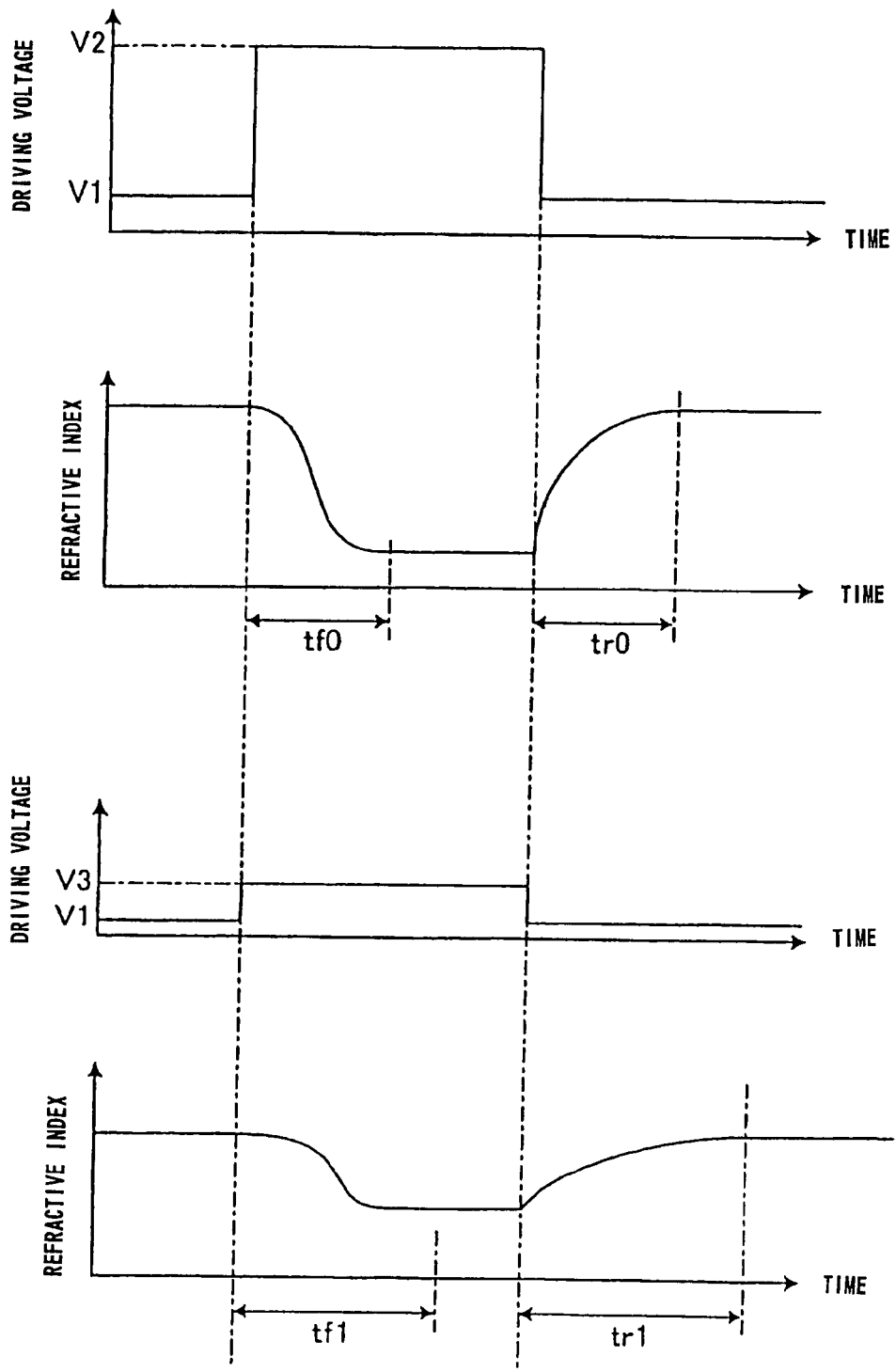
FIG. 25 is a diagram showing an example of driving voltage profile of the liquid crystal lens mounted on an automatic focusing apparatus of the present invention, and change of the refractive index.

Here, control of the liquid crystal lens system 1 in the automatic focusing apparatus according to the embodiment is explained. First, change in the refractive index when a voltage is applied to the liquid crystal is explained in a situation where light having the polarization plane in the same direction as the alignment direction of the liquid crystal is passing through the liquid crystal. FIG. 25 is an explanatory diagram illustrating the change in the refractive index when a voltage is applied to the liquid crystal, and a graph showing the driving voltage profile when a low driving voltage is applied on the liquid crystal, and a graph showing the refractive index change at this time. In addition, both the liquid crystal lens for the P wave and the liquid crystal lens for the S wave constituting the liquid crystal lens system 1 control the light entering into this liquid crystal lens system 1 by the driving unit not shown in the figure.

As shown in the waveform of the driving voltage and the refractive index of FIG. 25 upper side, when a driving voltage V2 is applied under the condition a driving voltage V1 has been already applied to the liquid crystal, the refractive index of liquid crystal moves into the state corresponding to the driving voltage V2 being delayed by the transient response operation period tf0 from the timing of the rise of the driving voltage V1. And the refractive index of the liquid crystal returns to the original state, being delayed by the period tr0 from the timing of fall of the driving voltage from V2 to V1. These transient response operation periods, tf0 and tr0, are periods when the liquid crystal is carrying out the transient response operation, and the refractive index changes gradually.

On the other hand, as shown in the waveform of the driving voltage and the refractive index on the lower side of FIG. 25, if a driving voltage V3 smaller than the driving voltage V2 is applied, the refractive index of the liquid crystal moves into the state corresponding to the driving voltage V3 being delayed from the timing of the rise of the driving voltage from V1 to V3 by the transient response operation period tf1. The refractive index of the liquid crystal returns to the original state, being delayed by the transient response operation period tr1 from the timing of the fall of the driving voltage. In these ways, the present figure shows that the transient response operation periods tf1 and tr1 are longer than the transient response operation periods tf0 and tr0. By the way, the driving voltages V1, V2, and V3 are, for example, pulse height modulated (PHM) alternating voltages.

For example, suppose that the liquid crystal lens 7 and the pattern electrodes 10 in which the dimensions and characteristics of each part have the values mentioned above are used. Moreover, suppose that, as the liquid crystal layer 14, a nematic liquid crystal of which refractive index for an extraordinary light ne and the refractive index for a normal light no are 1.75 and 1.5 respectively, and of which birefringence $\Delta n$ is 0.25 is used. In this case, when driving voltage V1 is set to 1 V and driving voltage V2 is set to 5 V, both the transient response operation period tf0 of the liquid crystal for the voltage rise and the transient response operation period tr0 of the liquid crystal for the voltage fall are both about 500 ms. And if the driving voltage V1 is set to 1 V and the driving voltage V3 is set to 2 V, where the driving voltages are in the same pulse height modulation (PHM), the transient response operation period tf1 of the liquid crystal for a voltage rise and the transient response operation period tr1 for a voltage fall are both about 800 ms.

In this way, when different driving voltages are simply applied to the core electrode 20 and to the peripheral electrode 22 for obtaining a final refractive index distribution, the distribution of the transient response operation period is generated radially from the core to the periphery. That is, on the side to which a low voltage was applied, the transient response operation period becomes longer. Then, the refractive index distribution becomes less suitable during the transient response, so that the lens aberration becomes large.

Therefore, to reduce the lens aberration during the transient response period of the liquid crystal, a procedure for modulation should adopted in which in place of the smaller driving voltage (corresponds to the driving voltage V3 in FIG. 25) among the driving voltages applied to the core electrode 20 and to the peripheral electrode 22, a larger voltage than having been planned in the early stage is applied instead by a voltage applying unit, and after maintaining the voltage for a certain period, the driving voltage is reduced gradually.

Figure 26:
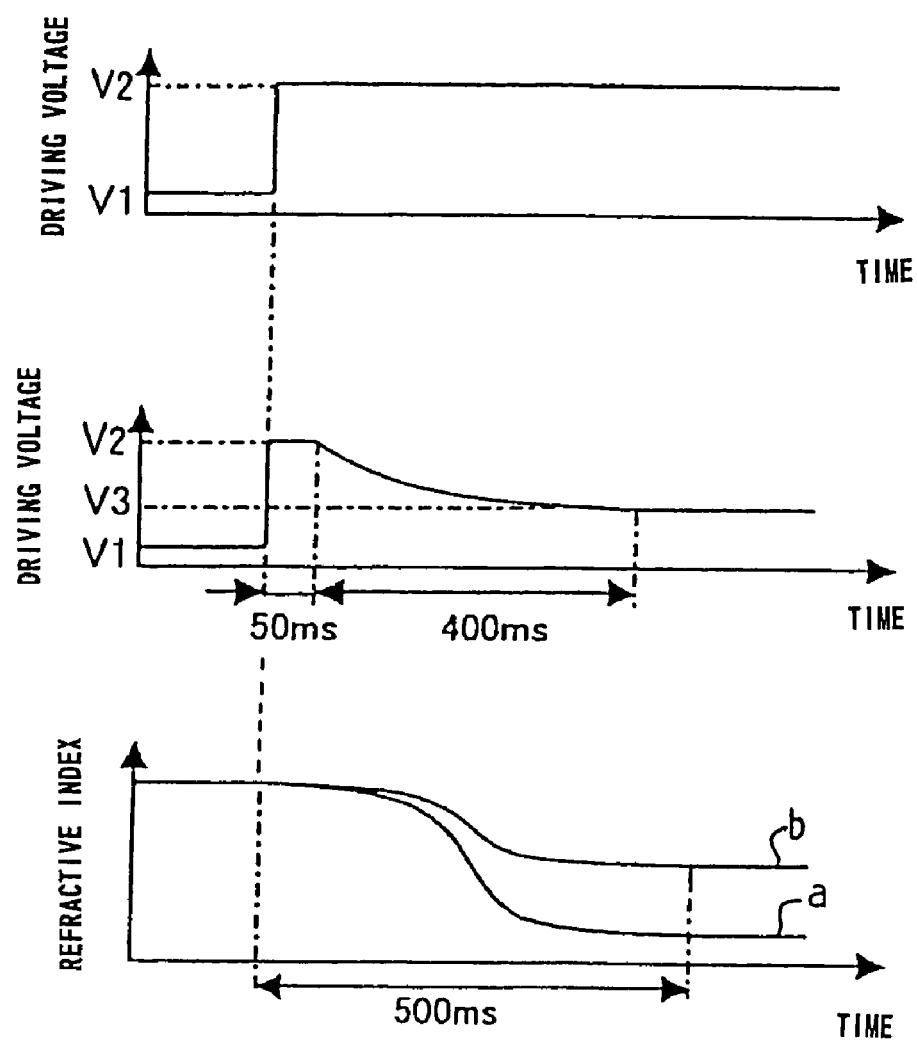
FIG. 26 is a diagram showing an example of the driving voltage profile of the liquid crystal lens mounted on the automatic focusing apparatus, and change of the refractive index during the transient response operation period.

FIG. 26 is a diagram showing an example of the voltage modulating unit, and the change in the refractive index during the transient response operation period, and shows an example of the driving voltage profile applied to the peripheral electrode 22 by this voltage modulating unit, and shows an example of the driving voltage profile applied to the core electrode 20, and shows a refractive index change in the liquid crystal layer when the driving voltage profiles are adopted on sequentially.

As shown in FIG. 26, the case where a high driving voltage V2 is applied to the peripheral electrode 22, and a low driving voltage V3 is applied to the core electrode 20, is considered. And it is assumed that the driving voltages V2 and V3 have been pulse height modulated (PHM). Here, a modulated driving voltage is applied to the core electrode 20 such that a driving voltage V3 modulated to the same pulse height as the driving voltage applied to the peripheral electrode 22 is applied for 50 ms at the beginning, and afterwards the pulse height is gradually decreased over the period of 400 ms and it is assumed that the modulation which decreased the applied driving voltage up to V3 was performed. Then, the transient response on the core electrode 20 side and that on the peripheral electrode 22 side becomes almost the same in the early phase, and can be made to reach the steady state in about 500 ms. And, by making the liquid crystal lens perform such operations, the lens aberration during the transient response can be largely reduced. Additionally, a curve a of the refractive index in FIG. 26 shows change of the refractive index by the side of the peripheral electrode 22, and a curve b is change of the refractive index by the side of the core electrode 20 respectively.

When the above modulations are performed, the transient response of the liquid crystal in the ring electrode 21 between the core electrode 20 and the peripheral electrode 22 will be influenced by the modulated driving voltage, since all of these electrodes are electrically connected by the ring connections 23. However, the driving voltage applied to the ring electrode 21 is a resistance divided voltage of the core electrode 20 driving voltage and the peripheral electrode 22 driving voltage. Therefore, the ring electrode 21 nearer the core electrode 20 will be more strongly influenced by the above-mentioned modulating unit, and as shown in the curves a and b of the refractive index shown in FIG. 26, the transient response time becomes almost same over the side near the ring electrode 22 from the side near the core electrode 20.

In addition, in the above-mentioned modulating unit, as the modulating unit of the driving voltage applied to the core electrode 20, a modulating unit in which an enlarged amplitude is applied only for a predetermined time and then the amplitude is gradually decreased to make to the predetermined amplitude, was shown. However, in the early phase, the driving voltage may be set to the same voltage as the driving voltage V2 applied to the peripheral electrode 22, and this driving voltage may be dropped gradually to the driving voltage V3. Moreover, the driving voltage applied in an early phase is not necessarily V2, but a higher voltage than V2 may be set and may be returned to the desired driving voltage V3.

Also in the embodiment, a unit to sample, with a predetermined cycle, the image signals generated from the optical images passed through the liquid crystal lens system 1 and the optical lens system 2 during the transient response operation period of the liquid crystal was adopted in the same way as the above-mentioned embodiment. The profile of the changes in the refractive index of the liquid crystal and in the focal length of the liquid crystal lens 7 during the transient response operation period tf upon the rise of the driving voltage, are the same as in the first embodiment shown in FIG. 6, therefore, explanation thereof is omitted. An example of the relation between the focal length of the liquid crystal lens 7 in the static state and the voltage applied to the liquid crystal lens 7 to make the focal length a given value is also the same as in the first embodiment shown in FIG. 7, therefore explanation thereof is omitted. As shown in FIG. 7, it can be seen that the liquid crystal lens becomes in the convex lens states, the parallel glass state, and the concave lens state, respectively, by setting the voltage applied to the core electrode 20, i.e., the core voltage Vinner and the voltage applied to the peripheral electrode 22, i.e., the peripheral voltage Vouter, into combination of different voltages.

Figure 27A:
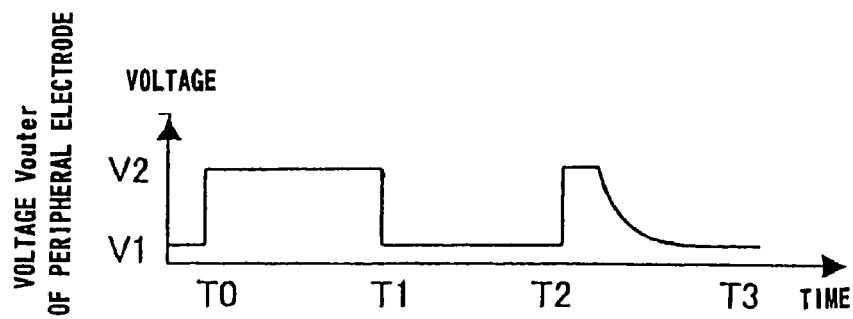
FIGS. 27A, 27B and 27C are diagrams showing the profiles of voltage applied to the peripheral electrode and the core electrode of the liquid crystal lens mounted in the automatic focusing apparatus, and inverse of the focal length.
Figure 27B:
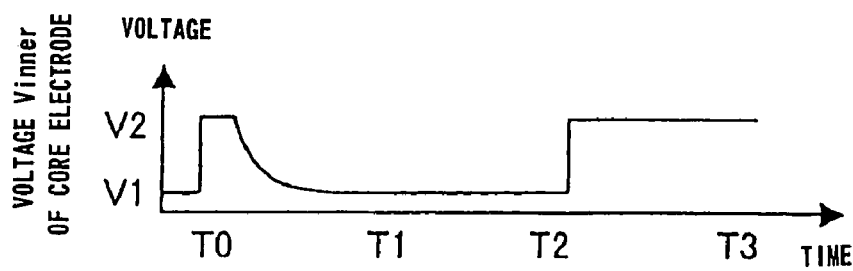
Figure 27C:
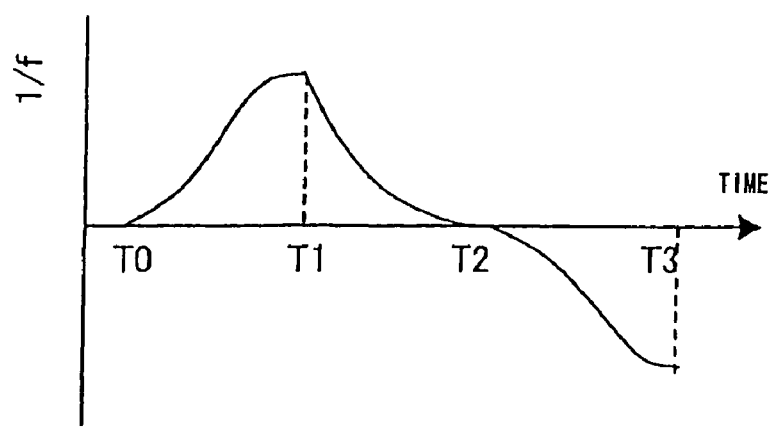

Next, the voltage application patterns to the liquid crystal lens 7 for putting the liquid crystal lens 7 into both the convex lens state and the concave lens state is explained. FIG. 27A is a diagram showing the voltage Vouter profile applied to the peripheral electrode 22 in the liquid crystal lens 7, FIG. 27B is an explanatory diagram showing the voltage Vinner profile applied to the core electrode 20 in the liquid crystal lens 7, and FIG. 27C is an explanatory diagram showing the change in the inverse of the focal length when the voltage profiles according to FIG. 27A and FIG. 27B are applied to the liquid crystal lens. By the way, the liquid crystal lens 7 becomes in the convex lens state when the voltage Vouter applied to the peripheral electrode 22 in the pattern electrode 10 is higher than the voltage Vinner applied to the core electrode 20, and when the situation is reversed, the liquid crystal lens 7 becomes in the concave lens state. Although various voltage application patterns may be figured out, an example of the case making the convex lens state will be explained hereafter.

As shown in FIGS. 27A and 27B, both the voltage Vouter first applied to the peripheral electrode 22 of the pattern electrodes 10 and the voltage Vinner applied to the core electrode 20 are set to be the first voltage V1. Subsequently at time T0, the voltage Vouter of the peripheral electrode 22 and the voltage Vinner of the core electrode 20 are changed to the second voltage V2 higher than the first voltage V1. Next, after 50 ms, the voltage Vinner of the core electrode 20 is gradually decreased and it is made the first voltage V1. Then, at time T1, the voltage Vouter of the peripheral electrode 22 is changed to the first voltage V1. Next, at time T2, the voltage Vinner of the core electrode 20 and the voltage Vouter of the peripheral electrode 22 are changed to the second voltage V2, the voltage Vouter of the peripheral electrode 22 is gradually decreased after 50 ms, and it is made the first voltage V1 and the operation is terminated at time T3.

The liquid crystal lens 7 is in the parallel glass state at time T0, is in the convex lens state in which the lens power becomes larger gradually in the period from time T0 to time T1, is in the convex lens state in which the lens power gradually becomes smaller in the period from the time T1 to the time T2, and is in the concave lens state in which the lens power becomes larger gradually in the period from time T2 to time T3.

When the liquid crystal lens 7 is operated in this way, as shown in FIG. 27C, the value of 1/f is zero at time T0, and between time T0 and time T1, the value changes along a downward convex curve, then along an upward convex curve after passing an inflection point, and at time T1, reaches the maximum positive value. Therefore, at time T1, the liquid crystal lens becomes in the convex lens state with the maximum lens power. And the value of 1/f changes, between time T1 and time T2, along a downward convex curve to reach the value zero, and between time T2 and time T3, the value changes along an upward convex curve and then along a downward convex curve to become the maximum negative value at time T3. Therefore, at time T3, the lens is in the concave lens state with the greatest lens power.

If the first voltage V1 is set to 1 V and the second voltage V2 is set to 5 V, the voltage Vouter of the peripheral electrode 22 rises at time T0, and since the first voltage V1 is lower compared with the second voltage V2, a voltage modulation is performed on the first voltage V1 according to the profile shown in FIG. 27B. At this time, the transient response operation time tf of the liquid crystal lens 7 can be made about 500 ms, as mentioned above.

Further, since the voltage Vinner of the core electrode 20 rises at time T2, a voltage modulation is performed on the voltage Vouter of the peripheral electrode 22 according to the profile shown in FIG. 27A. That is, at the time T2, the voltage Vouter of the peripheral electrode 22 is changed to the second voltage V2 higher than the first voltage V1, and after 50 ms, the driving voltage is gradually dropped. At this time, the transient response operation time tf of the liquid crystal lens 7 is about 500 ms, as mentioned above. Therefore, the time required to complete the autofocus control is about 1.5 seconds in total.

Next, an evaluation of the plural autofocus signals obtained for the liquid crystal lens 7 both in the convex lens state and in the concave lens state is explained. Although not particularly limited, it is assumed here that in the configuration shown in FIG. 1 without the liquid crystal lens system 1, the optical lens system 2 has focused on a photographic subject at a distance L of 200 mm.

Therefore, in the configuration according to the embodiment, when the distance L to a photographic subject is shorter than 200 mm, the liquid crystal lens 7 is put into the convex lens state, while, when the distance L to the subject is longer than 200 mm, the liquid crystal lens 7 is put into the concave lens state, as in the case of the above-mentioned embodiment. As described above, also in this embodiment, in the case when the liquid crystal lens 7 is in the convex lens state, the focal length f is expressed with a positive value, and in the case when the liquid crystal lens 7 is in the concave lens state, it is expressed with a negative value.

And, in the convex lens state, the power of the liquid crystal lens 7 becomes weaker along with the change in f value of 100 mm, 200 mm, 500 mm, and 1000 mm, and in the concave lens state the power of the liquid crystal lens 7 becomes weaker along with the change in the value f, for example, of −100 mm, −200 mm, −500 mm and −1000 mm.

Figure 28:
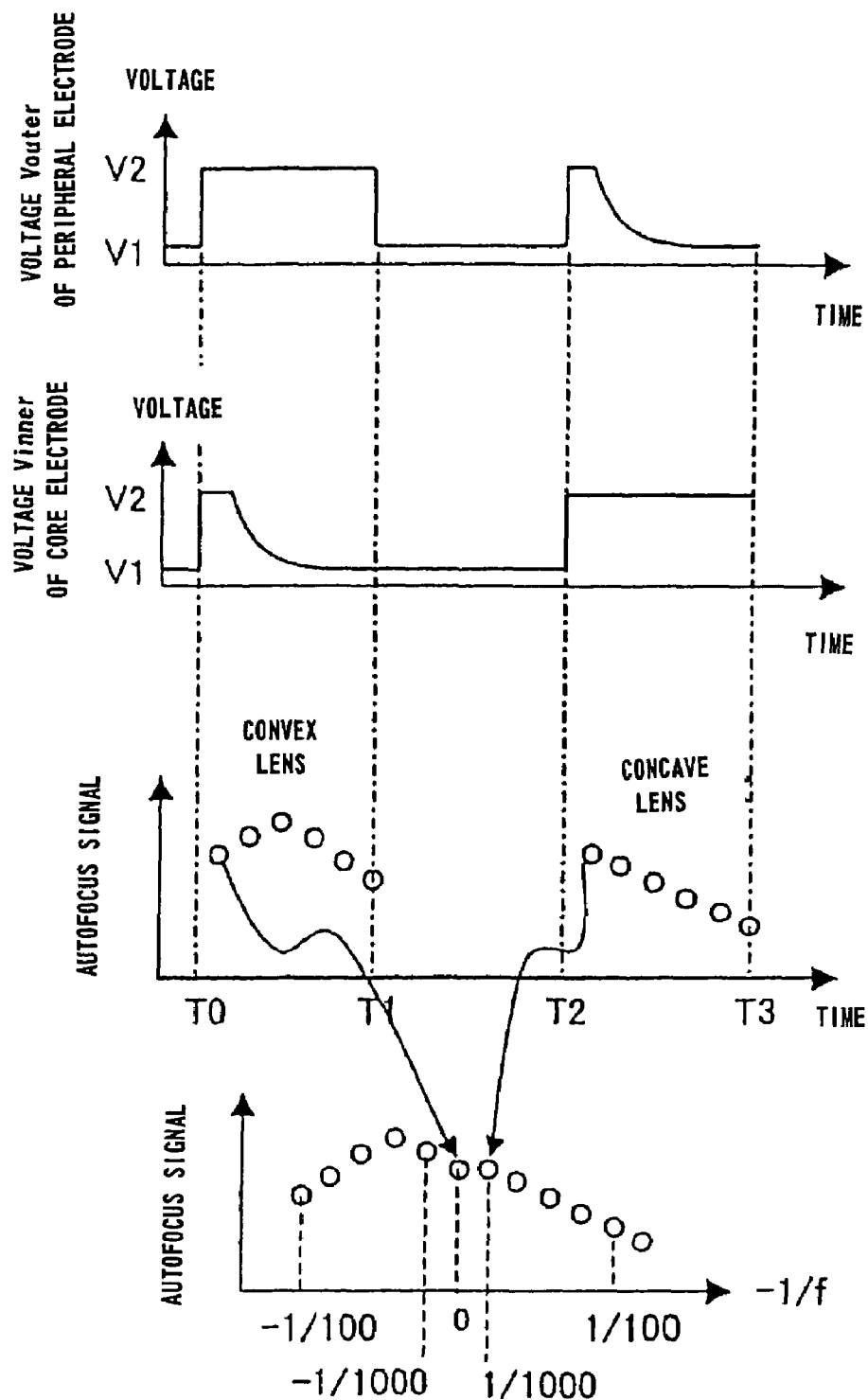
FIGS. 28 and 29 are explanatory diagrams showing different examples of the method of evaluation of the autofocus signals in the automatic focusing apparatus.
Figure 29:
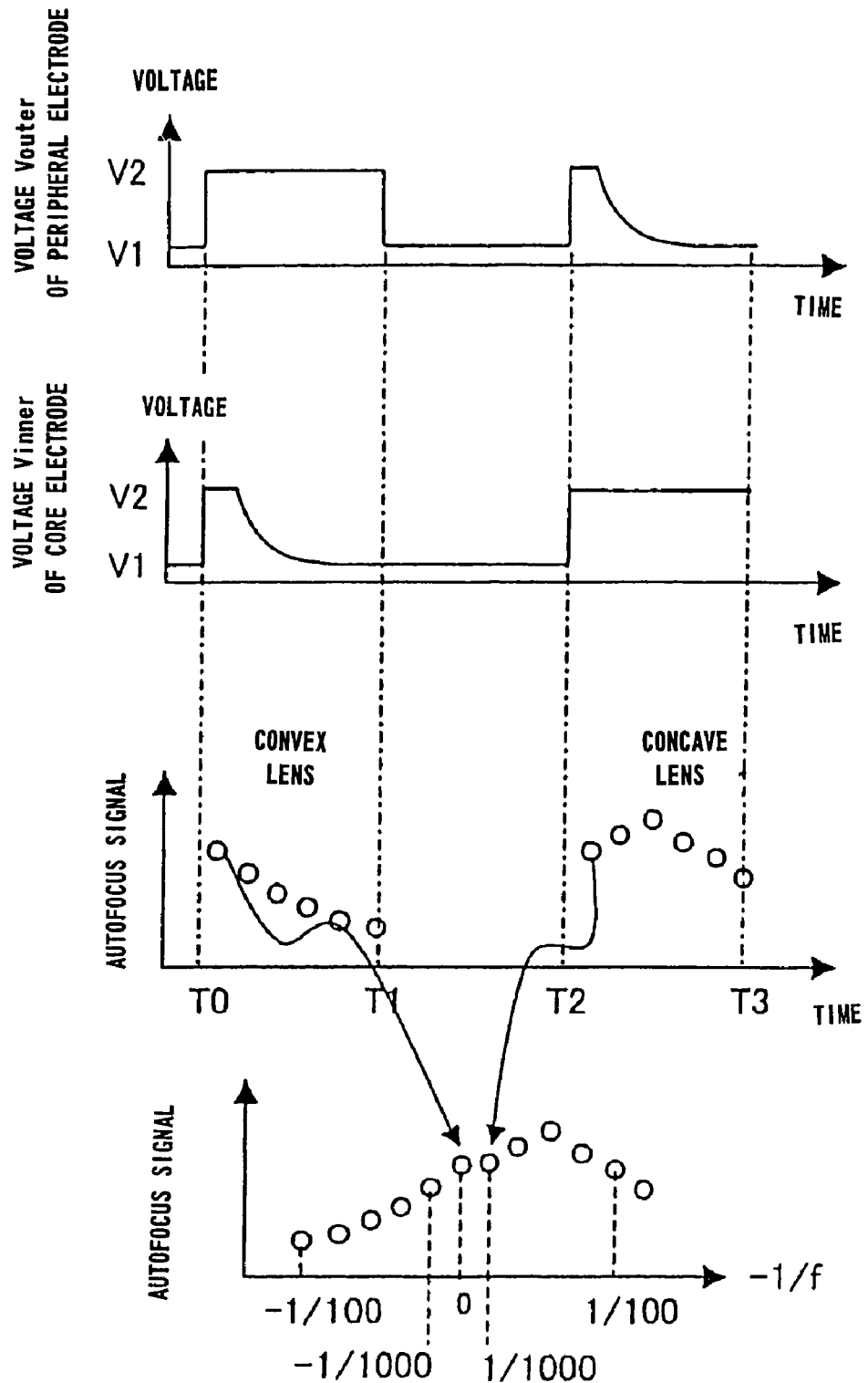

These phenomena are explained, by taking up the voltage application pattern shown in FIGS. 27A to 27B as an example. FIGS. 28 and 29 are diagrams illustrating a method of evaluation of the autofocus signals in the voltage application profile shown in FIGS. 27A to 27B.

As shown in FIG. 28 and FIG. 29, in these voltage application patterns of the voltage Vouter of the peripheral electrode 22 and the voltage Vinner of the core electrode 20 during the period from time T0 to time T1 when the liquid crystal lens 7 is in the convex lens state, six autofocus signals are obtained in the illustrated examples although not particularly limited.

Moreover, in the period from time T2 to time T3 when the liquid crystal lens 7 is in the concave lens state, six autofocus signals are obtained in the illustrated examples, although not particularly limited. In these cases, it is preferable that sampling is started with a little delay after the time of changing the voltage Vouter of the peripheral electrode 22 or the voltage Vinner of the core electrode 20.

And the example shown in FIG. 28 is a case where the distance L to a photographic subject is shorter than 200 mm, for example, 170 mm. Therefore, when the liquid crystal lens 7 is in the convex lens state, the autofocus signal becomes the maximum. Here, for convenience, the value of inverse of the focal length f with reversed positive/negative sign, i.e., the value of −1/f is used.

When plural autofocus signals obtained by the sampling during the transient response operation period of the liquid crystal lens 7 are arranged based on the value of −1/f in order from the negative value having the largest absolute value to the positive value having the largest absolute value, the autofocus signals are expressed as shown on the lowest portion of FIG. 28. In this illustrated example, it can be seen that the autofocus signals have been sampled in the range of the −1/f values from −1/100 to 1/100. Also it can be seen that at the value of −1/f between −1/100 and −1/1000, the autofocus signal is the maximum.

The example shown in FIG. 29 is a case where the distance L to a photographic subject is longer than 200 mm, for example, 350 mm. Therefore, the autofocus signal becomes the maximum, when the liquid crystal lens 7 is in the concave lens state. Plural autofocus signals obtained by the sampling during the transient response operation period of the liquid crystal lens 7 are arranged based on the value of −1/f in the order from the negative value having the largest absolute value to the positive value having the largest absolute value, the autofocus signals are expressed as shown for showing on the lowest portion of FIG. 29.

Also in this illustrated example, it can be seen that the autofocus signals are sampled in the range of the −1/f values from −1/100 to 1/100. It can be seen that at the value of −1/f between 1/100 and 1/1000, the autofocus signal becomes the maximum. In either case, the levels of all the autofocus signals are compared and the maximum value among the autofocus signals is judged after all the samplings of the focus signals is completed. The principle of the contour detection procedure in which the autofocus signal becomes the maximum when a photographic subject is public known, therefore explanation thereof is omitted here.

When the distance L to a photographic subject is shorter than 200 mm, the maximum value of the autofocus signal is obtained within the period (T0 to T1) where the liquid crystal lens 7 is in the convex lens state. In that case, the operation within the period of T1 to T2 and T2 to T3 after that may be cancelled.

Furthermore, to detect that the maximum value of the autofocus signal was obtained at the stage when the liquid crystal lens 7 has experienced only one out of the convex lens state and concave lens state, the maximum value of the autofocus signal is judged when plural autofocus signals are obtained only in either one of these periods. Then, it is judged that the maximum value obtained as a result of the judgment is larger than the respective levels of the autofocus signals obtained at the sampling timings just before and just after the sampling timing at which the maximum value was obtained.

The automatic focusing apparatus according to the present invention not merely applies the driving voltages to the pattern electrode formed in the liquid crystal lens by the voltage applying unit, but includes a modulating unit that eliminates the delay of a transient response operation in the liquid crystal area on which the smaller driving voltage among driving voltages is applied, and applies this predetermined driving voltage (specifically, for example pulse width modulation (PWM) voltage so that it may enable to judge the maximum focus signal by means of a focus point judging unit using plural pieces of focus signal data obtained by sampling the focus signals at predetermined cycles when the liquid crystal is in the transient response operation.

By constituting such automatic focusing apparatus, due to the effect to make the response of the liquid crystal on the low-voltage-applied-side in the liquid crystal lens quicker, the focus point can be obtained with a suitable refractive index distribution also during the transient response of the liquid crystal.

Since a schematic configuration of the automatic focusing apparatus according to this case is the same as that of the automatic focusing apparatus shown in FIG. 1, explanation thereof is omitted. Since a configuration of the liquid crystal lens system 1 and a configuration of the pattern electrode with which the liquid crystal lens 7 was equipped, and an operation of this liquid crystal lens in the automatic focusing apparatus according to the embodiment is the same as that of the automatic focusing apparatus according to the embodiment shown in FIGS. 2 to 4, explanation thereof is also omitted.

Here, control of the liquid crystal lens system 1 in the automatic focusing apparatus according to the embodiment is explained. Here, the change in the refractive index when voltage is applied to liquid crystal in a condition that the light with the polarization plane in the same direction as the alignment direction of the liquid crystal is passing through the liquid crystal is the same as that of the fourth embodiment shown in FIG. 25, therefore, explanation thereof is omitted. However, it is different from the embodiment on the point that the driving voltages V1, V2, and V3 in FIG. 25 are the pulse width modulated (PWM) alternating voltages, for example.

Figure 30:
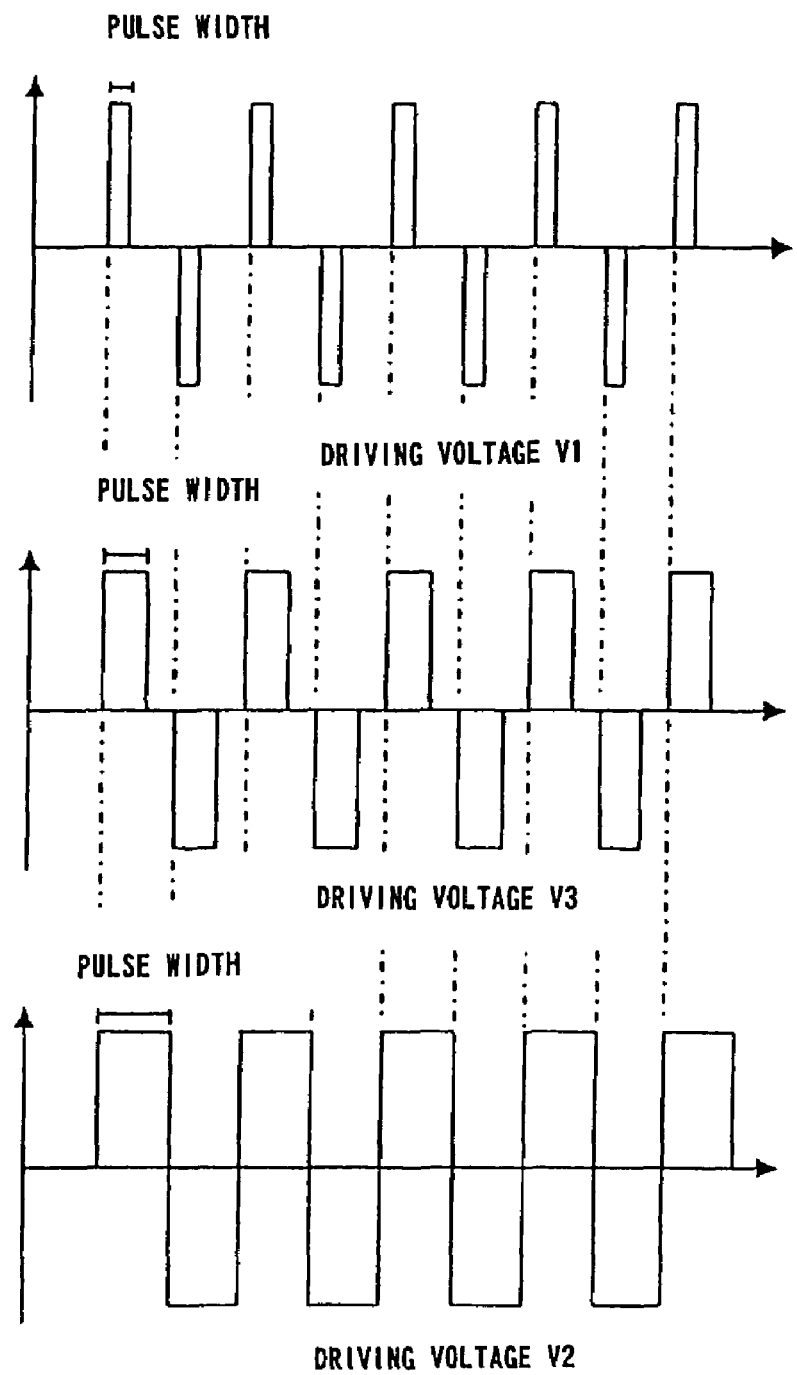
FIG. 30 is a wave form chart showing a pulse-width-modulated driving waveform applied to the liquid crystal lens mounted in the automatic focusing apparatus of the present invention.

Next, the pulse width modulated (PWM) waveforms are shown in FIG. 30. The waveform corresponding to the driving voltage V1 with the smallest effective voltage is shown in upper side portion, the waveform corresponding to the driving voltage V2 with the largest effective voltage is shown in lower side portion, and the waveform corresponding to the intermediate driving voltage V3 between V1 and V2 is shown in intermediate portion, respectively. Frequencies are all definite, and are square waves of about 1 kHz, for example, and the effective voltage is changed by changing the pulse width.

For example, we assume to use the liquid crystal lens 7 and the pattern electrode 10 with each of their parts having above mentioned dimensions and characteristics. Moreover, we assume to use, for the liquid crystal layer 14, a nematic liquid crystal having the refractive index ne for the extraordinary light of 1.75, and the refractive index no for the ordinary light of 1.5, respectively, and having the birefringence Δn of 0.25. In this case, when driving voltage V1 is set to 1 [Vrms] (expression by effective voltage, and hereafter specific driving voltage means effective voltage) and driving voltage V2 is set to 5 [Vrms], both the transient response operation period tf0 of the liquid crystal for the voltage rise and the transient response operation period tr0 of the liquid crystal for the voltage fall are about 500 ms. And when driving voltages are applied in the same pulse width modulation (PWM), if the driving voltage V1 is set to 1 [Vrms] and the driving voltage V3 is set to 2 [Vrms], the transient response operation period tf1 of the liquid crystal for a voltage rise and the transient response operation period tr1 for a voltage fall both become about 800 ms.

Here, when different driving voltages for obtaining a final refractive index distribution are simply applied to the core electrode 20 and to the peripheral electrode 22, a distribution of the transient response operation period is generated radially from the core to the periphery. That is, on the side where a low voltage was applied, the transient response operation period becomes longer. Then, the refractive index distribution becomes less suitable during the transient response, so that the lens aberration becomes large.

Therefore, to reduce the lens aberration during the transient response period of the liquid crystal, a method of modulation is adopted, similarly to the above-mentioned embodiment, in which by a voltage applying unit, a larger value of the driving voltage than having been planned in the early stage is applied in place of the smaller driving voltage (the driving voltage V3, see FIG. 25(c)) among the driving voltages applied to the core electrode 20 or to the peripheral electrode 22, and after maintaining the voltage for a certain period, the driving voltage is reduced gradually.

Figure 31:
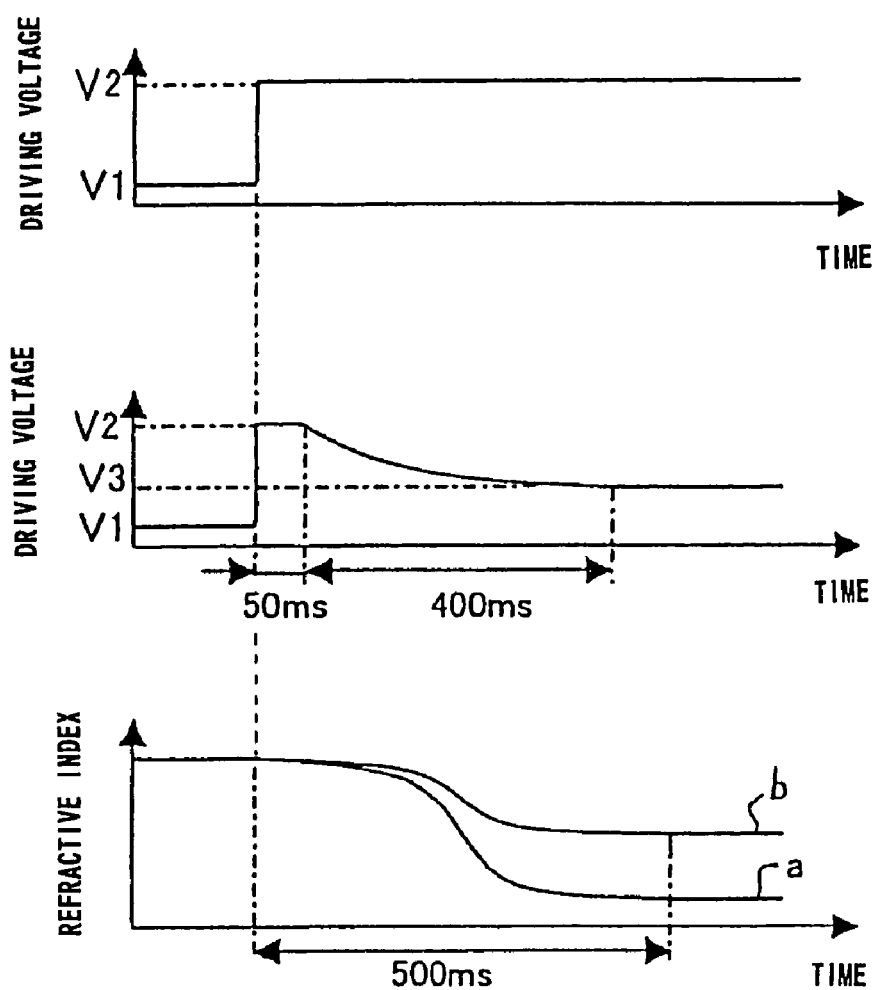
FIG. 31 is a diagram showing an example of driving voltage profile of the automatic focusing apparatus and change in the refractive index during the transient response operation period.

FIG. 31 is an explanatory diagram showing an example of the voltage modulating unit and the change in the refractive index during the transient response operation period. For example, as shown in FIG. 31(a), the case where a high driving voltage V2 is applied to the peripheral electrode 22 and a low driving voltage V3 is applied to the core electrode 20 is considered. It is assumed that the driving voltages V2 and V3 have been pulse width modulated (PWM). Here, a modulated driving voltage that is modulated such that a driving voltage V3 is applied for 50 ms at the beginning, and afterwards pulse width is gradually shortened over the period of 400 ms is applied to the core electrode 20. Then, the transient response on the core electrode 20 side and that on the peripheral electrode 22 side becomes similar in the early phase, and can be made to reach the steady state in about 500 ms. By making the liquid crystal lens perform such operations, the lens aberration during the transient response can be largely reduced. Additionally, a curve a of the refractive index in FIG. 26 shows change of the refractive index by the side of the peripheral electrode 22, and a curve b is change of the refractive index by the side of the core electrode 20 respectively.

When the above modulations are performed, the transient response of the liquid crystal in the ring electrode 21 between the core electrode 20 and the peripheral electrode 22 will be influenced by the modulated driving voltage, since all of these electrodes are electrically connected by the ring connections 23. However, the driving voltage applied to the ring electrode 21 is a resistance divided voltage of the core electrode 20 driving voltage and of the peripheral electrode 22 driving voltage. Therefore, the ring electrode 21 positioned closer to the core electrode 20 is more strongly influenced by the modulating unit, and as shown in the curves a and b of the refractive index shown in FIG. 31, the transient response time becomes almost about the same over the liquid crystal from the side near the core electrode 20 to the side near the peripheral electrode 22.

In this example, while for the modulating unit to modulate the driving voltage applied to the core electrode 20, a modulation to lengthen the pulse width for a predetermined time, and after that, to shorten the pulse width gradually and smoothly to make to the predetermined pulse width has been explained, the driving voltage applied to the core electrode 20 may be set to the same driving voltage V2 applied to the peripheral electrode 22 in the early phase, and the pulse width is shortened in plural steps to become the driving voltage V3, or the driving voltage applied in an early phase may not be the same as the driving voltage applied to the peripheral electrode 22, but may be set to be higher than that. Furthermore, the modulating unit in which the liquid crystal has small aberration for acting as a lens is desirable.

Also in this embodiment, a unit to sample, with a predetermined cycle, the image signals generated from the optical images having passed through the liquid crystal lens system 1 and the optical lens system 2 during the transient response operation period of the liquid crystal was adopted as well as the automatic focusing apparatus explains initially. The profile of the changes in the refractive index of the liquid crystal and in the focal length of the liquid crystal lens 7 during the transient response operation period upon the rise of the driving voltage tf are the same as in the embodiment shown in FIG. 6, so that their explanations are omitted. An example of the relation between the focal length of the liquid crystal lens 7 in the static state and the voltage applied to the liquid crystal lens 7 to put the focal length into a given value is also the same as in the embodiment shown in FIG. 7, therefore, explanation thereof is omitted. As shown in FIG. 7, it can be seen that the liquid crystal lens becomes in the convex lens state, the parallel glass state, and the concave lens state, respectively, by setting the voltage applied to the core electrode 20, i.e., the core voltage Vinner and the voltage applied to the peripheral electrode 22, i.e., the peripheral voltage Vouter, into combination of different voltages.

The voltage application patterns to the liquid crystal lens 7 for putting the liquid crystal lens 7 into both the convex lens state and the concave lens state are the same as those in the fourth embodiment shown in FIGS. 27A, 27B, and 27C, so that their explanations are omitted. Since the method of evaluation of the autofocus signals in the voltage application profile is also the same as that of the embodiment shown in FIGS. 28 and 29, explanation thereof is omitted.

Embodiment of AF Apparatus Having Area Setting Unit

Next, an embodiment of an automatic focusing apparatus having an area setting unit according to the invention will be described. The autofocus device in each embodiment described below also has the same hardware configuration as that of the automatic focusing apparatus which has been previously described with FIG. 1 to FIG. 4.

This embodiment has an area setting unit for setting an area from which a focus signal is extracted of an optical image formed trough an optical lens unit including a liquid crystal lens. Further, a focus signal extracting unit extracts a plurality of focus signals by performing, at predetermined cycles, sampling of an image signal generated based on the optical image in the area set by the area setting unit, by light that has passed through the liquid crystal lens under transient response operation caused by application of a predetermined voltage by a voltage applying unit. Since the functions and operations other than the above are the same as those in the example of each of the previously-described embodiments, the explanation thereof will be omitted.

Figure 35:
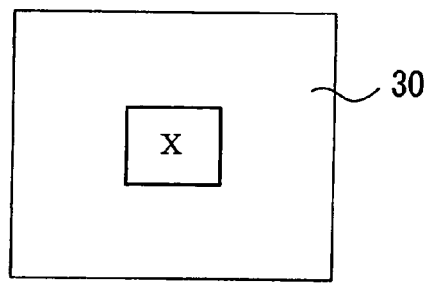
FIG. 35 is an explanatory diagram showing the example of the area set up by S102 of FIG. 32.

A first embodiment of the automatic focusing apparatus having the area setting unit will be described first using FIG. 32 and FIG. 35.

Figure 32:
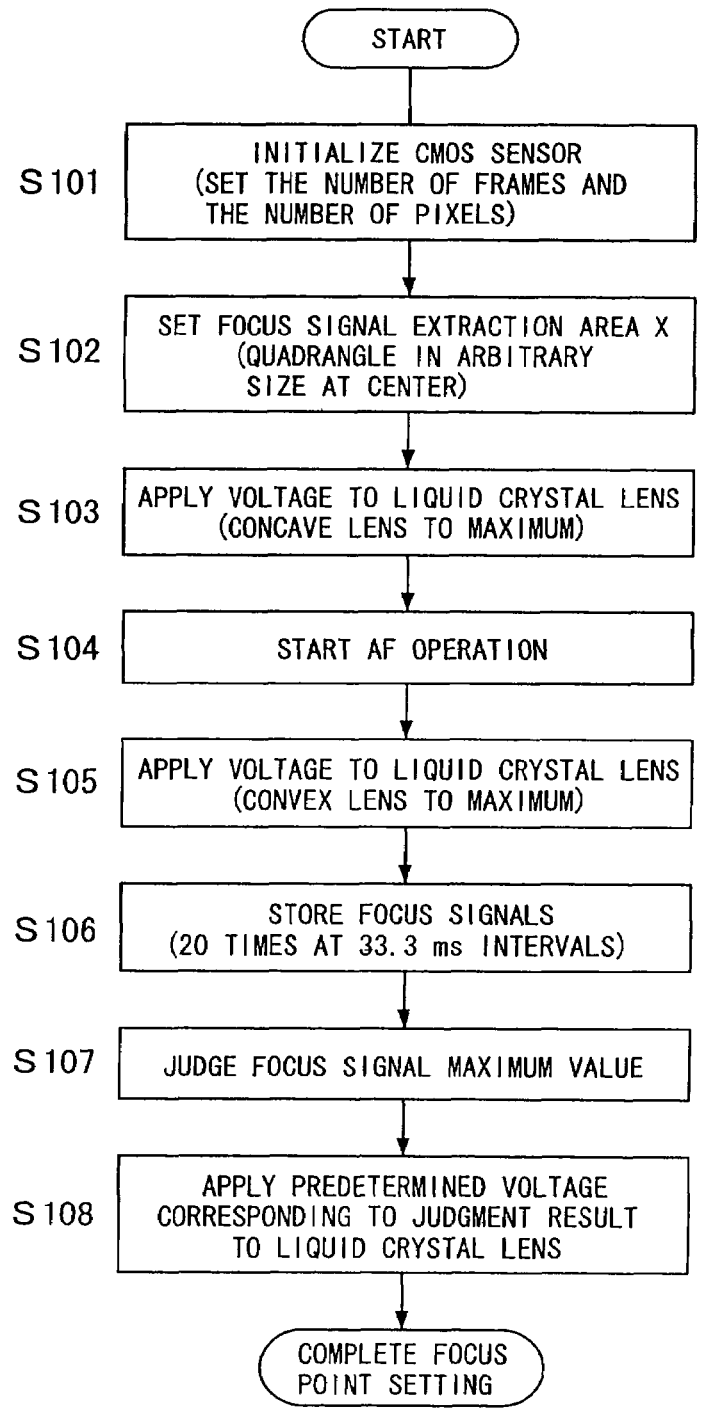
FIG. 32 is a flowchart of operation of the automatic focusing apparatus by the first embodiment which has an area setting unit according to the present invention.

FIG. 32 is a flowchart of the autofocus operation according to this embodiment, which is performed by the microprocessor 51 of the controller 5 in FIG. 1. In this flowchart and the flowchart in a second embodiment and the following explanation, "Step" is abbreviated to "S."

The processing shown in FIG. 32 is started taking, as a trigger, the initial press of the shutter button of the image pickup apparatus such as a camera or the like incorporating this automatic focusing apparatus. The CMOS sensor corresponding to the image pickup device 3 shown in FIG. 1 is initialized first in S101 to set the number of frames and the number of pixels. Note that the setting of the number of frames and the number of pixels may be done in advance as an image pickup condition before the pressing of the button of the image pickup apparatus.

In the subsequent S102, the area from which the focus signal is extracted of an optical image formed passed through the optical lens unit including the liquid crystal lens is set (corresponding to the area setting unit). In this example, a predetermined area (a quadrangle area in an arbitrary size) X is set which is at the center portion of the effective image pickup area 30 (corresponding to the entire image formation area) shown in FIG. 35 of the image pickup device (CMOS sensor) 3 shown in FIG. 1.

The setting is performed by storing the coordinates of the vertexes of the quadrangle, the coordinates of two vertexes in a diagonal relationship of each quadrangle, or the number of the line and the number of the pixel in the area into the RAM of the storage unit 52 shown in FIG. 1.

Subsequently, a predetermined voltage (for example, a voltage to maximize the lens power of the concave lens) is applied to the liquid crystal lens 7 in S103, the AF operation is started in S104, and a predetermined voltage different from the predetermined voltage applied in S103 (for example, a voltage to maximize the lens power of the convex lens) is applied to the liquid crystal lens 7 in S105.

Subsequently, in S106, a plurality of focus signals are extracted by performing, at predetermined cycles (for example, 20 times at 33.3 ms intervals), sampling of an image signal generated based on the optical image in the area X set in the S102 of the image pickup device 3, by the light that has passed through the liquid crystal lens under transient response operation caused by the application of the different predetermined voltage, and stored into the RAM of the storage unit 52 shown in FIG. 1 (corresponding to the focus signal extracting unit).

After every sampling has been finished, a maximum value of the focus signal is judged in S107 (corresponding to the focus point judging unit). This judgment is as has been previously described in the various examples.

Subsequently, a predetermined voltage corresponding to the judgment result is applied to the liquid crystal lens in S108 to complete the focus point setting.

In other words, the driving voltage of the liquid crystal lens is obtained based on the data previously stored in the storage unit 52 from the elapsed time at the point in time corresponding to the focus signal which has been judged as the maximum value in S107, and the obtained driving voltage is applied to the liquid crystal lens 7. This is also as has been previously described.

According to this embodiment, the area from which the focus signal is extracted is limited to the center portion of the screen, thus ensuring that when the photographic subject is a person or the like, the image in which the person or the like near the center of the screen is in focus is quickly obtained.

Next, a second embodiment of the automatic focusing apparatus having the area setting unit will be described using FIG. 33, FIG. 34 and FIG. 36.

Figure 33:
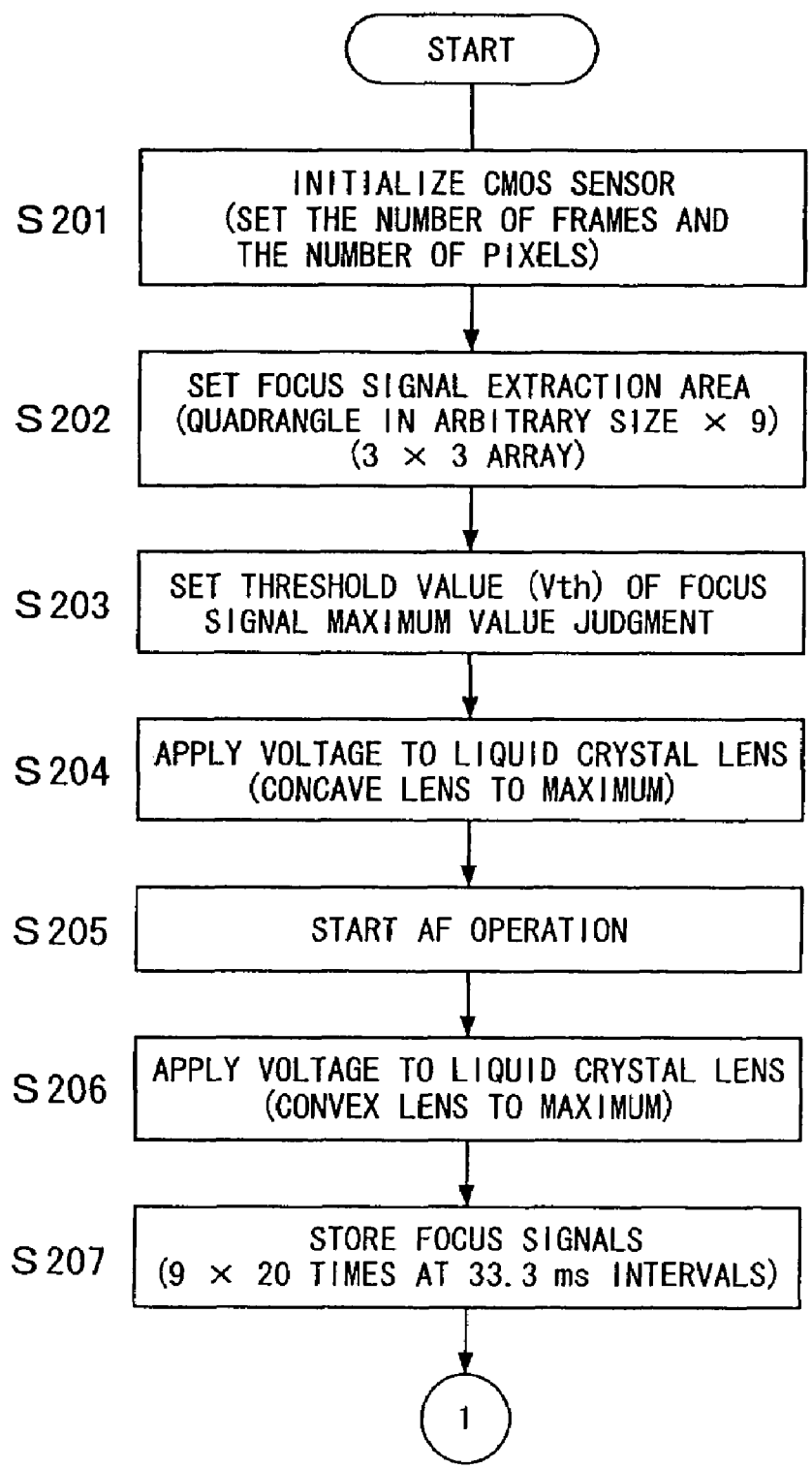
FIG. 33 is a flowchart of a first half part operation of the automatic focusing apparatus by the second embodiment which has an area setting unit according to the present invention.
Figure 34:
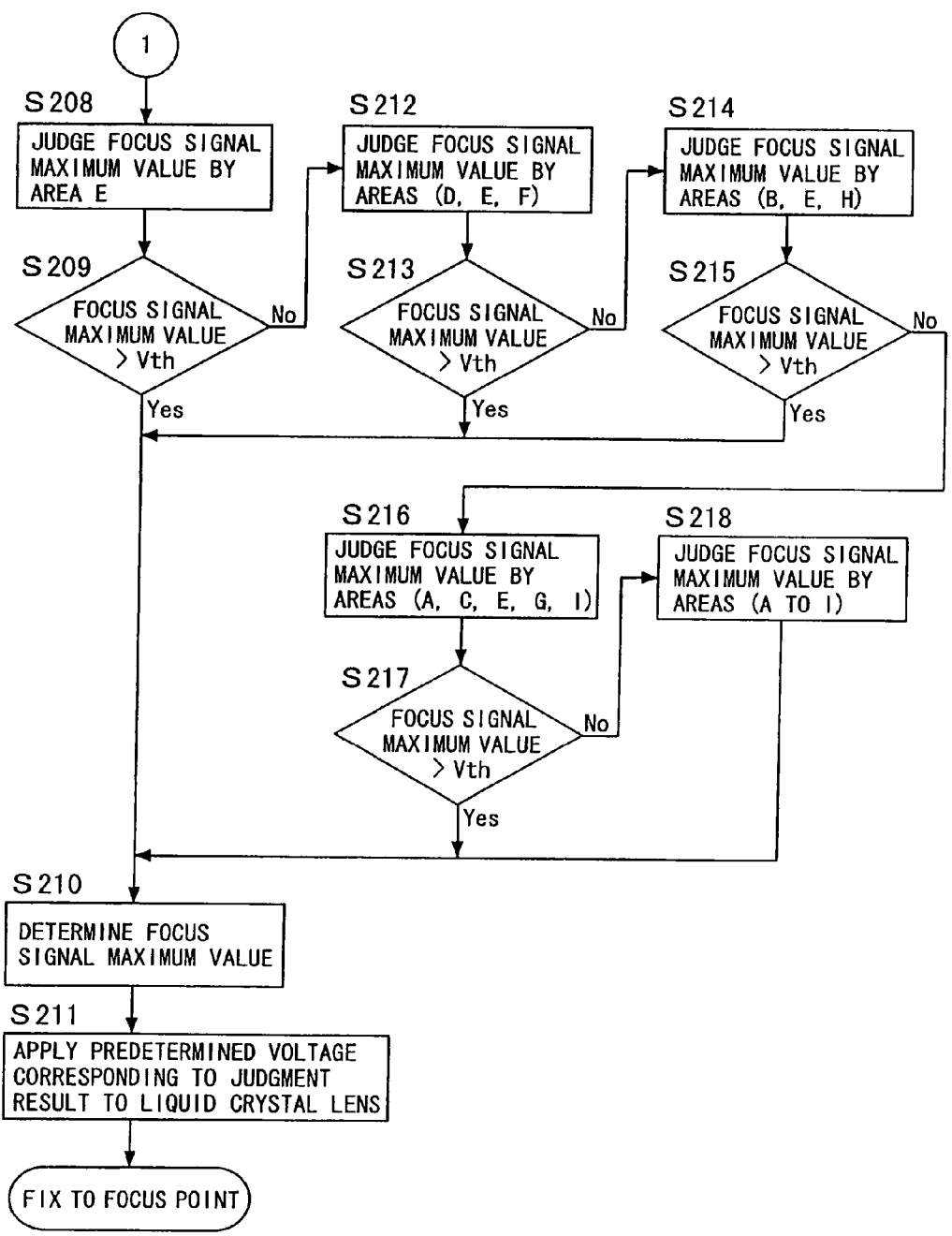
FIG. 34 is a flowchart of a last half part operation by the second embodiment.

FIG. 33 and FIG. 34 are flowcharts of the autofocus operation according to this embodiment which is performed by the microprocessor 51 of the AF controller 5 in FIG. 1, and show a series of operations but divided into two charts for convenience of illustration.

After start of the processing shown in FIG. 33, the CMOS sensor corresponding to the image pickup device 3 shown in FIG. 1 is initialized first in S201 to set the number of frames and the number of pixels.

In the subsequent S202, the area from which the focus signal is extracted of an optical image formed passed through the optical lens unit including the liquid crystal lens is set (corresponding to the area setting unit). In this example, an area slightly inside the effective image pickup area 30 (corresponding to the entire image formation area) shown in FIG. 36 of the image pickup device (CMOS sensor) 3 shown in FIG. 1 is divided into a matrix form composed of nine quadrangle areas A to I in a three-by-three array, and one or more of them is/are selected and set as the area from which the focus signal is extracted.

The setting is also performed by storing the coordinates of the vertexes of each of the quadrangles, the coordinates of two vertexes in a diagonal relationship of each of the quadrangles, or the number of the line and the number of the pixel in each of the areas A to I into the RAM of the storage unit 52 shown in FIG. 1.

Further, a threshold value (Vth) of focus signal maximum value judgment, that is, the threshold value of the maximum value of the focus signal judged by the focus point judging unit is set in S203.

The setting of the threshold value (Vth) may be performed before the setting of the area for extraction of the focus signal in S202 or may be performed concurrently therewith.

Subsequently, a predetermined voltage (for example, a voltage to maximize the lens power of the concave lens) is applied to the liquid crystal lens 7 in S204, the AF operation is started in S205, and a predetermined voltage different from the predetermined voltage applied in S204 (for example, a voltage to maximize the lens power of the convex lens) is applied to the liquid crystal lens 7 in S206.

Subsequently, in S207, a plurality of focus signals are extracted for each of the areas A to I by performing, at predetermined cycles (for example, 9×20 times at 33.3 ms intervals), sampling of an image signal generated based on the optical image in each of the areas A to I set in the S202 of the image pickup device 3, by the light that has passed through the liquid crystal lens under transient response operation caused by the application of the different predetermined voltage, and stored into the RAM of the storage unit 52 shown in FIG. 1 (corresponding to the focus signal extracting unit).

After every sampling has been finished, the flow proceeds to S208 in FIG. 34 in which a maximum value of the focus signal is judged based on the stored value of the focus signal by the area E at the center portion of the screen. The maximum value of the focus signal by the judgment result is compared to the threshold value (Vth) in S209 so that if it exceeds the threshold value, the maximum value of the focus signal is determined to be that value in S210, and a predetermined voltage corresponding to the judgment result is applied to the liquid crystal lens in S211 to complete the focus point setting.

In other words, a driving voltage for the liquid crystal lens is obtained based on the data previously stored in the storage unit 52 from the elapsed time at the point in time corresponding to the focus signal which has been judged as the maximum value in S210, and the obtained driving voltage is applied to the liquid crystal lens 7.

Figure 36:
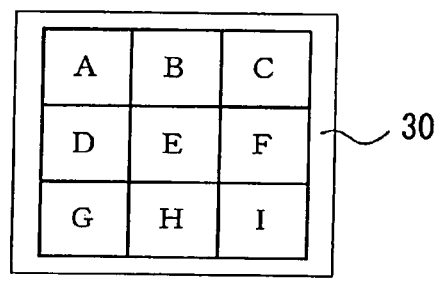

If the focus signal maximum value does not exceed the threshold value (Vth) in S209, the flow proceeds to S212 in which the maximum value of the focus signal is judged based on the stored values of the focus signals by the areas D, E, and F shown in FIG. 36. In this case, the maximum value of the average value (or the weighted average may be employed) of the focus signals by the areas D, E, and F may be judged, or the maximum value of the focus signals of the areas D, E, and F may be judged.

The maximum value of the focus signal by the judgment result is then compared to the threshold value (Vth) in S213 so that if it exceeds the threshold value, the maximum value of the focus signal is determined to be that value in S210, and a predetermined value corresponding to the judgment result is applied to the liquid crystal lens in S211 to complete the focus point setting.

If the focus signal maximum value does not exceed the threshold value (Vth) in S213, the flow proceeds to S214 in which the maximum value of the focus signal is judged based on the stored values of the focus signals by the areas B, E, and H shown in FIG. 36. The judgment method in this case is also similar to that described in S212.

The maximum value of the focus signal by the judgment result is then compared to the threshold value (Vth) in S215 so that if it exceeds the threshold value, the maximum value of the focus signal is determined to be that value in S210, and a predetermined value corresponding to the judgment result is applied to the liquid crystal lens in S211 to complete the focus point setting.

If the focus signal maximum value does not exceed the threshold value (Vth) in S215, the flow proceeds to S216 in which the maximum value of the focus signal is judged based on the stored values of the focus signals by the areas A, C, E, G, and I shown in FIG. 36. The judgment method in this case is also similar to that described in S212.

The maximum value of the focus signal by the judgment result is then compared to the threshold value (Vth) in S217 so that if it exceeds the threshold value, the maximum value of the focus signal is determined to be that value in S210, and a predetermined value corresponding to the judgment result is applied to the liquid crystal lens in S211 to complete the focus point setting.

If the focus signal maximum value does not exceed the threshold value (Vth) in S217, the flow proceeds to S218 in which the maximum value of the focus signal is judged based on the stored values of the focus signals by all of the areas A to I shown in FIG. 36. The judgment method in this case is also similar to that described in S212.

The maximum value of the focus signal is determined to be that value in S210, and a predetermined value corresponding to the judgment result is applied to the liquid crystal lens in S211 to complete the focus point setting.

Note that the judgment result of the maximum value of the focus signal in S218 may also be compared to the threshold value (Vth), so that error processing may be performed if it does not exceed the threshold value to display impossibility of AF or to emit a warning beep.

According to this embodiment, the focus point of almost all of images can be judged.

Next, a third embodiment of the automatic focusing apparatus having the area setting unit will be described using FIG. 37.

Since the flowchart of the autofocus operation according to this embodiment is almost the same as the flowchart in the first embodiment shown in FIG. 32, its illustration is omitted.

Figure 37:
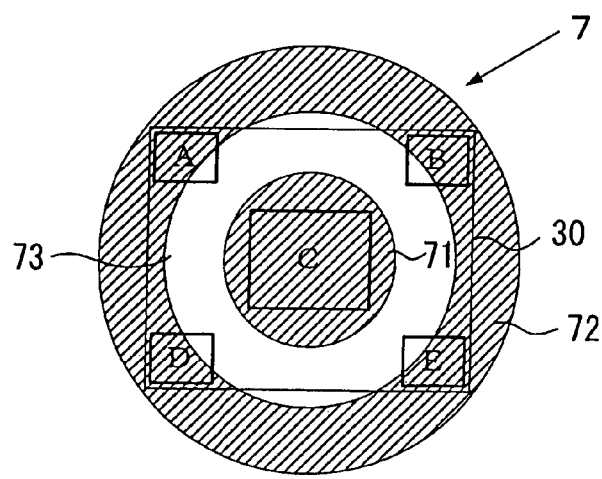
FIG. 37 is an explanatory diagram of the example of area set up by the third embodiment of the automatic focusing apparatus which has an area setting unit according to the present invention.

When the voltage pattern to maximize the lens power of the concave lens is applied to the liquid crystal lens and the voltage pattern to maximize the lens power of the convex lens is then applied as described above, or when the voltage pattern to maximize the lens power of the convex lens is applied to the liquid crystal lens and the voltage pattern to maximize the lens power of the concave lens is applied, a center portion 71 and a peripheral portion 72 that have hatching of the liquid crystal lens 7 shown in FIG. 37 relatively quickly respond because of great changes in the voltages applied to them, whereas an intermediate portion 73 has a low response speed because of a small change in the voltage applied thereto.

Hence, the autofocus operation similar to that in the flowchart shown in FIG. 32 is performed in the third embodiment, but the setting in the processing of setting the focus signal extraction area in S102 is performed by combining the predetermined area C at the center portion of the effective image pickup area 30 (corresponding to the entire image formation area) of the image pickup device and a plurality of areas at the peripheral portion, in this example, the quadrangle areas A, B, D, and E at four corners while avoiding the intermediate portion 73 of the liquid crystal lens shown in FIG. 37.

Such setting allows for extraction of the focus signal from the image by the light that has passed through the area of the liquid crystal lens that has a relatively quick response, thus increasing the speed of the focus point detection and also increasing the accuracy.

As explained above, according to the present invention, since plural focus signals are extracted by sampling image signals plural times during the transient response operation period of the liquid crystal lens 7, the focus point can be detected during one or two times of the transient response operation period of the liquid crystal lenses 7. Therefore, an automatic focusing apparatus that can detect the focus point sufficiently speedily for practical use is obtained.

Further, setting of the area from which the focus signal is extracted of the optical image formed through the optical lens unit including the liquid crystal lens can increase the accuracy of the focus point detection and increase its speed.

Moreover, according to the present invention, since the moving parts, such as an actuator for driving a lens are not required, downsizing of the device can be attained. Moreover, power consumption can be reduced. Further, since it is excellent in shock resistance, a merit of high reliability is also obtained. Also, since the liquid crystal lens system 1 serves also as the protective windowpane outside the optical lens system 2, downsizing of the apparatus can be attained further.

In the above, the present invention is not limited to each embodiment mentioned described above, and various modifications can be applied. For example, the values indicated in the embodiments, such as those of dimensions, characteristics and times are only examples, and the present invention is not limited to those values. Also, the type of the liquid crystal is not limited to the nematic liquid crystals, either.

Moreover, the transient response operation times tf and tr of the liquid crystal are not always about 500 ms. For example, the response speed of the liquid crystal to the rise and the fall of a driving voltage varies depending on the driving system of the liquid crystal is whether the pulse height modulation method or the pulse width modulation method, resulting in variation of tf and tr.

Moreover, since the characteristics of the liquid crystal change depending on the material of the liquid crystal, the response speed of the liquid crystal to the rise and the fall of the driving voltage varies, resulting in variation of tf and tr. Especially when the TN (twist nematic) liquid crystal is used, influence of the rotational viscosity and the like is large.

Furthermore, alignment of the liquid crystal includes homogeneous (horizontal) alignment, homeotropic (vertical) alignment, hybrid alignment, twist alignment, and bend alignment. Depending on such alignment, the response speed of the liquid crystal to the rise and the fall of a driving voltage varies, resulting in variation of tf and tr. Moreover, tf and tr vary according to a configuration of cells and the like.

As described above, the automatic focusing apparatus according to the present invention is useful for apparatus having autofocus functions, and is especially suitable for automatic focusing functions of a camera, a digital camera, a movie camera, a camera unit in a cellular phone equipped with a camera, a camera mounted on a vehicle, etc. as a rear monitor etc., a camera unit of an endoscope, and glasses having the function of changing the focal length of the lens, and the like.

What is claims is:

1. An automatic focusing apparatus comprising:
   an optical lens unit including a liquid crystal lens;
   a photoelectric converting unit that converts an optical image formed through the optical lens unit into an electrical signal to output an image signal; and
   a liquid crystal lens control unit that extracts a focus signal corresponding to a focus matching degree from the image signal, and controls a driving condition of the liquid crystal lens such that the focus signal becomes maximum value, wherein the liquid crystal lens control unit includes
   an area setting unit that sets an area from which the focus signal is extracted of the optical image formed through the optical lens unit,
   a voltage applying unit that applies a predetermined voltage to the liquid crystal lens,
   a focus signal extracting unit that extracts a plurality of focus signals by performing, at predetermined cycles, sampling of an image signal generated based on an optical image of the area set by the area setting unit by the light that has passed through the liquid crystal lens under transient response operation caused by application of the predetermined voltage by the voltage applying unit, and
   a focus point judging unit that judges a maximum value of the focus signal based on the focus signals extracted by the focus signal extracting unit.

2. The automatic focusing apparatus according to claim 1, wherein the area setting unit sets a predetermined area at the center portion of an entire image formation area as the area from which the focus signal is extracted.

3. The automatic focusing apparatus according to claim 1, wherein the area setting unit divides an entire image formation area into a matrix form, and selects and sets one or more of the divided individual areas as the area from which the focus signal is extracted.

4. The automatic focusing apparatus according to claim 3, further comprising:
   a threshold value setting unit that sets a threshold value of the maximum value of the focus signal judged by the focus point judging unit,
   wherein if the maximum value of the focus signal judged by the focus point judging unit does not exceed the threshold value set by the threshold value setting unit, the area setting unit changes the selection of the divided individual areas and resets the area from which the focus signal is extracted.

5. The automatic focusing apparatus according to claim 1, wherein the area setting unit sets the predetermined area at the center portion of the entire image formation area and a plurality of areas at the peripheral portion in combination as the area from which the focus signal is extracted.

6. The automatic focusing apparatus according to claim 1, wherein the voltage applying unit applies, as the predetermined voltage, a voltage to bring the liquid crystal lens into a convex lens state.

7. The automatic focusing apparatus according to claim 1, wherein the voltage applying unit applies, as the predetermined voltage, a voltage to bring the liquid crystal lens into a concave lens state.

8. The automatic focusing apparatus according to claim 1, wherein the voltage applying unit applies, as the predetermined voltage, a first voltage to bring the liquid crystal lens into a convex lens state, and a second voltage to bring the liquid crystal lens into a concave lens state, at different timings.

9. The automatic focusing apparatus according to claim 8, wherein the voltage applying unit applies voltage such that a period is present in which a third voltage that is neither to bring the liquid crystal lens into the convex lens state nor to bring the liquid crystal lens into the concave lens state is applied, between a period in which the first voltage is applied to the liquid crystal lens and a period in which the second voltage is applied to the liquid crystal lens.

10. The automatic focusing apparatus according to claim 8, wherein when the focus point judging unit judges that the focus signal is at a maximum value while the liquid crystal lens is in the transient response operation cased by application of either one of the first voltage and the second voltage by the voltage applying unit, the liquid crystal lens control unit cancels application of the other one of the first voltage or the second voltage to the liquid crystal lens by the voltage applying unit.

11. The automatic focusing apparatus according to claim 1, wherein
   the liquid crystal lens includes a liquid crystal layer held between two transparent substrates each of which has a pattern electrode and a common electrode formed thereon, the pattern electrode including a core electrode and peripheral electrodes connected with resistors, and the voltage applying unit applies different predetermined voltages to the core electrode and to the peripheral electrodes.

12. The automatic focusing apparatus according to claim 1, wherein the liquid crystal lens control unit further includes a measuring unit that measures elapsed time since the sampling is started;

a first storage unit that stores in advance data in which the elapsed time at each time point of sampling the image signal and a focal length of the liquid crystal lens are associated; and a second storage unit that stores in advance data in which a driving voltage of the liquid crystal lens in a static state and the focal length are associated, wherein the driving voltage of the liquid crystal lens is obtained based on the data in the first storage unit and the second storage unit, from the elapsed time by the measuring unit at the time point corresponding to the focus signal judged as the maximum value by the focus point judging unit, and the obtained driving voltage is applied to the liquid crystal lens.

* * * * *